IMAGE-REPRODUCING SYSTEM FOR
A COLOR-TELEVISION RECEIVER

Original Filed Oct. 5, 1953 7 Sheets-Sheet 1

United States Patent Office

Re. 24,882
Reissued Sept. 27, 1960

24,882

IMAGE-REPRODUCING SYSTEM FOR A COLOR-TELEVISION RECEIVER

Bernard D. Loughlin, Huntington, N.Y., assignor to Hazeltine Research, Inc., Chicago, Ill., a corporation of Illinois Original No. 2,734,940, dated Feb. 14, 1956, Ser. No. 384,237, Oct. 5, 1953. Application for reissue Sept. 24, 1957, Ser. No. 686,551

9 Claims. (Cl. 178—5.4)

Matter enclosed in heavy brackets [ ] appears in the original patent but forms no part of this reissue specification; matter printed in italics indicates the additions made by reissue.

GENERAL

The present invention is directed to image-reproducing systems for color-television receivers, and particularly, to such reproducing systems in a compatible color-television receiver utilizing a picture tube having a single electron gun for reproducing either color or monochrome images.

In a form of color-television system more completely described in an article in the magazine Electronics for February 1952, entitled "Principles of NTSC Compatible Color Television" at pages 88–95, inclusive, information representative of a scene in color being televised is utilized to develop at the transmitter two substantially simultaneous signals, one of which is primarily representative of the brightness or luminance and the other of which is representative of the chromaticity of the image. The latter signal is a subcarrier wave signal the frequency of which is within the band width of the brightness signal. This subcarrier wave signal has successive cycles each modulated in phase by signal components representative of primary colors or hues so that the cycles have substantially the same phase-hue characteristic. In such subcarrier wave signal the successive cycles are also modulated in amplitude by signal components representative of the color saturation of successive elemental areas of the televised color image. The composite, video-frequency signal comprising the brightness signal and the modulated subcarrier wave signal is one developed by the National Television System Committee (NTSC) for the translation of information representative of the color of the televised image and will be referred to hereinafter as the NTSC signal. This composite signal is utilized to modulate a conventional radio-frequency carrier-wave signal.

A receiver in such system intercepts the radio-frequency signal and derives the NTSC signal therefrom. One type of such receiver includes a pair of principal channels for applying the brightness and chrominance information to an image-reproducing device therein. The channel for translating the brightness signal is substantially the same as the video-frequency amplifier portion of a conventional monochrome receiver. The chrominance signal is translated through the second of such channels and three color-signal components individually representative of the three primary hues or colors red, green, and blue of the image are derived therefrom and are combined with the brightness signal in the image-reproducing device to effect reproduction of the televised image.

One form of image-reproducing device of the type just mentioned conventionally includes a cathode-ray tube having three electron guns, the three color-signal components being individually applied to different ones of the guns while the brightness signal is applied to each thereof. The electron beams emitted from the three guns are utilized individually to excite different ones of three phosphors which effectively develop three primary color images, such images being optically combined to reproduce the televised image. Such a device, because of the utilization of three separate subsidiary channels in the principal chrominance channel for translating the color information to the different phosphors in the cathode-ray tube, is subject to registration problems of the three primary color images developed by such phosphors. Such problems arise from the lack of proper relative alignment of the three electron beams when exciting the phosphors to develop the different color images. As a result, there is a tendency in such device, unless adjustments which tend to be exceptionally fine and critical are made and maintained, to have undesirable overlapping of images causing low definition and spurious color effects especially on the edges of the objects therein. Additionally, when utilizing such a device and the inherent three beam circuits in the picture tube for translating both the monochrome and color information there is a problem of critically balancing the relative intensities of the three beams so that they will have proper relative intensities to combine in the cathode-ray tube to reproduce a black and white image over the entire brightness range when only monochrome information is being received. Because of the above-described deficiencies in such multicolor channel devices, it is preferable to utilize a single-gun picture tube, thereby facilitating the utilization of a single channel for all of the monochrome and color information, provided other complexities in utilizing such tubes do not offset the advantages. By utilizing such single color channel, if the different colors are selected at the image screen of the picture tube, the above-mentioned registration problems are solved and the problem of critical balancing of the gains of different color channels disappears.

A single-gun tube of a type considered desirable has recently been described in the Proceedings of the IRE for July 1953, at pages 851–858, inclusive, in an article entitled "The PDF Chromatron—A Single or Multi-Gun Tri-Color Cathode-Ray Tube." This tube hereinafter referred to as the single-gun tube will be more fully considered hereinafter. However, there is one problem in utilizing such single-gun tube in that the three primary color images are sequentially reproduced by causing the electron beam therein periodically to impinge upon the different phosphors for developing the different component colors of the reproduced image and, as presently defined, the NTSC signal, for reasons to be discussed more fully hereinafter, does not lend itself to direct application to such tube if high-quality color reproduction is to be obtained. In the NTSC signal, the color components modulating different phase points of the subcarrier wave signal are not in proper phase relation and do not have proper relative intensities to cooperate with the impinging of the electron beam on the different phosphors to develop the primary color images. If the NTSC signal is directly applied to such tube, there tend to be color distortion and a loss of constant luminance in the reproduced image.

It has been proposed that such tube be utilized to reproduce a color image from the NTSC signal by initially deriving from such signal before application to the picture tube the signals representative of the three primary colors therefrom to obtain three simultaneous color signals. These derived color signals are then sequentially sampled at the correct times to develop a composite signal. The latter signal includes color components which, when applied to the single-gun tube, cooperate with the electron beam as it sequentially impinges on the different color phosphors to cause the different color signals to modulate the intensity of the beam as it impinges on corresponding ones of the color phosphors. Such decoding of the NTSC subcarrier wave signal and re-encoding by means of a sampling device is undesirable since the aforementioned problem of critically balancing the gains of three channels to obtain signals for reproducing desirable black and white images over the brightness range is introduced thereby. It is preferable to modify the NTSC signal directly, that is, without any decoding of the color components thereof so that the modified signal may be directly applied to the single-gun tube to reproduce acceptable color and black and white images.

It is, therefore, an object of the present invention to provide a new and improved image-reproducing system for a color-television receiver including a single-gun type of picture tube in which the deficiencies of prior such systems when utilizing an NTSC signal are diminished.

It is another object of the present invention to provide a new and improved image-reproducing system for a color-television receiver including a single-gun type of picture tube in which the NTSC signal is applied to such tube without any demodulation of the color components thereof prior to the application of such signal thereto.

It is a still further object of the present invention to provide a new and improved image-reproducing system for a color-television receiver including a single-gun type of picture tube in which the NTSC signal is modified prior to application to such tube.

In accordance with the present invention, an image-reproducing system for a color-television receiver comprises a circuit for supplying an NTSC signal including a first signal primarily representative of the brightness and a subcarrier wave signal representative of the chromaticity of a televised color image. The system also comprises a color image-reproducing apparatus including a multicolor image screen and means for scanning said screen with an electron beam, the scanning means including means for conditioning said apparatus to develop a plurality of colors in a sequence repeating at a predetermined frequency and in which one of the colors occurs twice. The image-reproducing system also comprises signal-modifying apparatus coupled to said supply circuit for translating said modulated subcarrier wave signal at a predetermined phase with respect to said sequence and for deriving from said subcarrier wave signal a modulated wave signal which differs in frequency therefrom and which is a harmonic of said predetermined frequency and has a predetermined phase with respect to said sequence. Finally, the image-reproducing system comprises a circuit for applying said first signal, said translated modulated subcarrier wave signal, and said derived wave signal to said apparatus for reproducing said color image.

For a better understanding of the present invention, together with other and further objects thereof, reference is had to the following description taken in connection with the accompanying drawings, and its scope will be pointed out in the appended claims.

Referring to the drawings.

Figure 1:
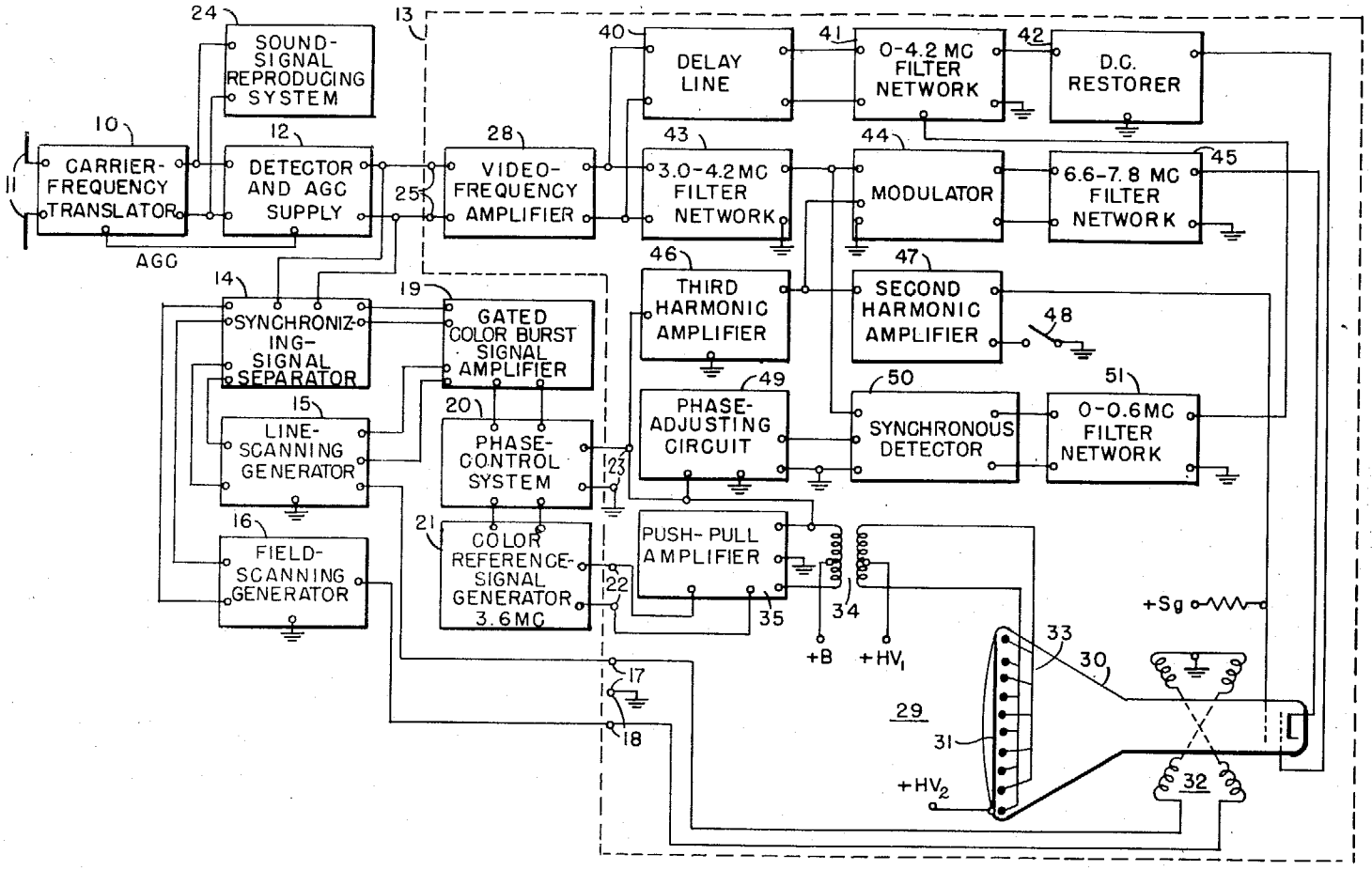
Fig. 1 is a schematic diagram of a color-television receiver including an image-reproducing system in accordance with the present invention.
Figure 1C:
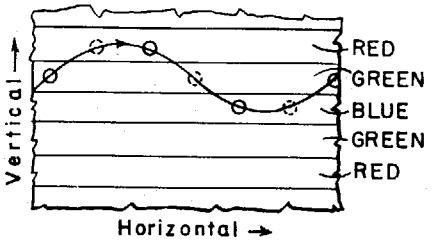
Fig. 1a is a diagrammatic representation of the image screen of the picture tube utilized in the receiver of Fig. 1.
Fig. 1b is a circuit diagram of the image-reproducing system of Fig. 1.
Figure 1D:
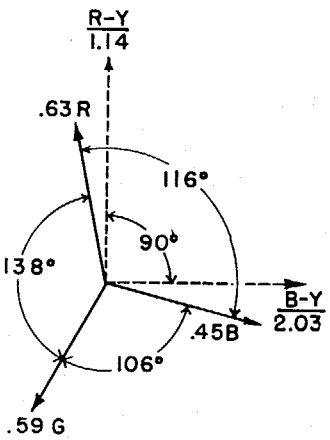
Figure 1B:
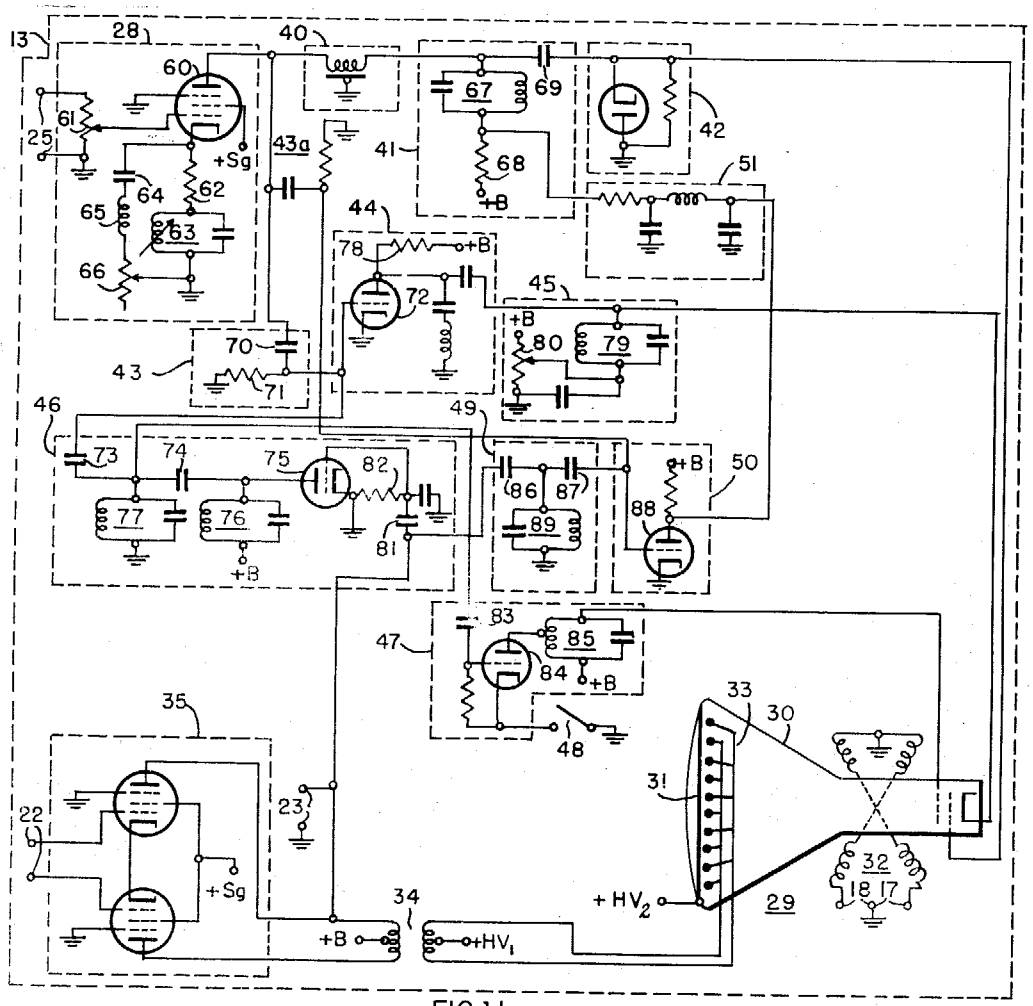
Figure 4A:
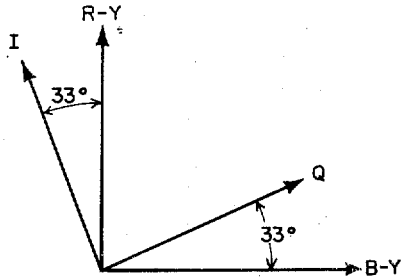
Figure 2:
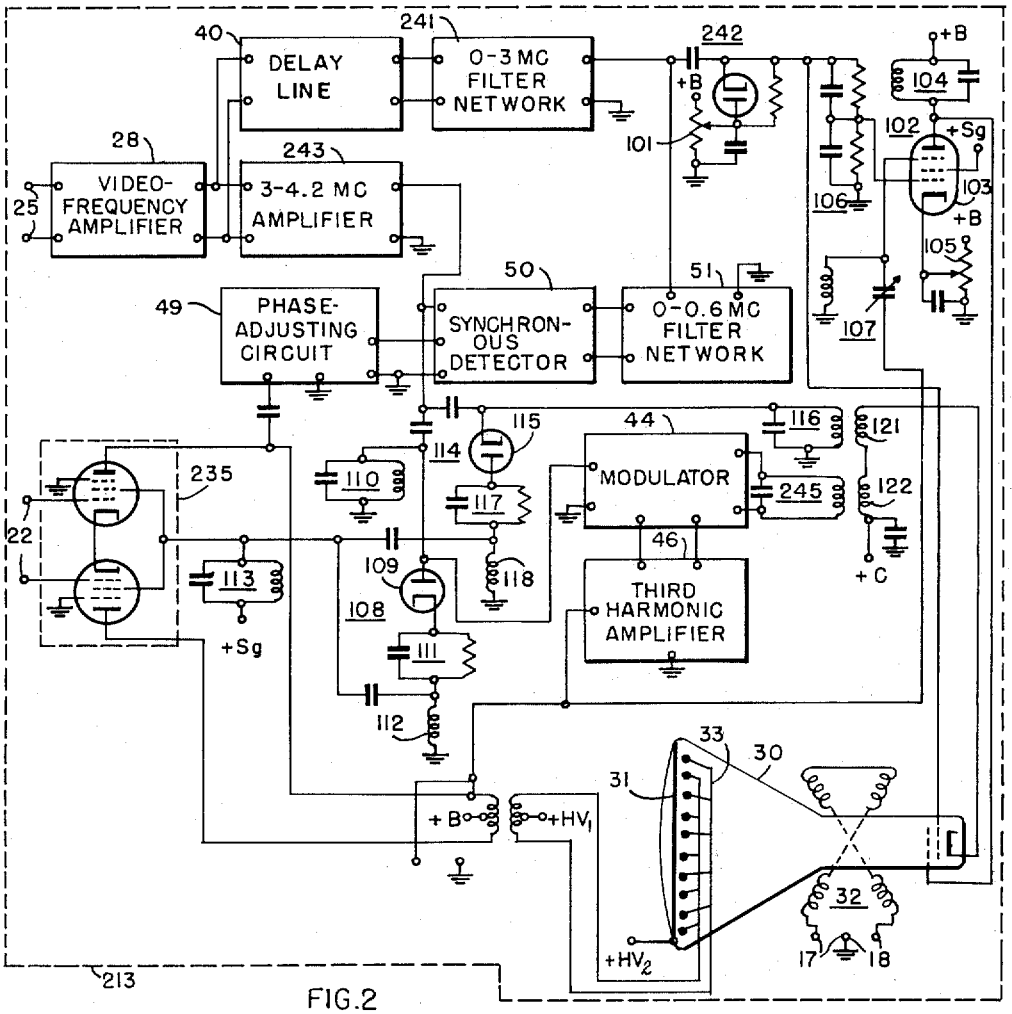
Figure 3:
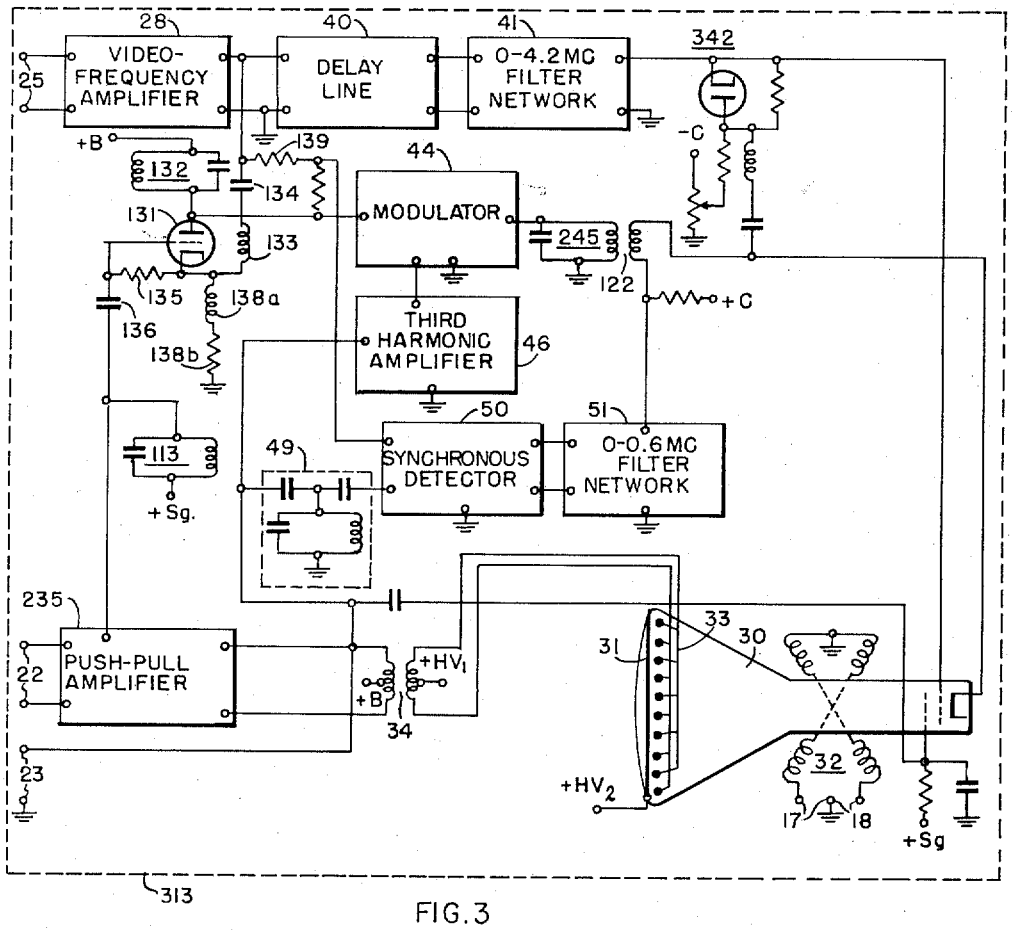
Figure 4:
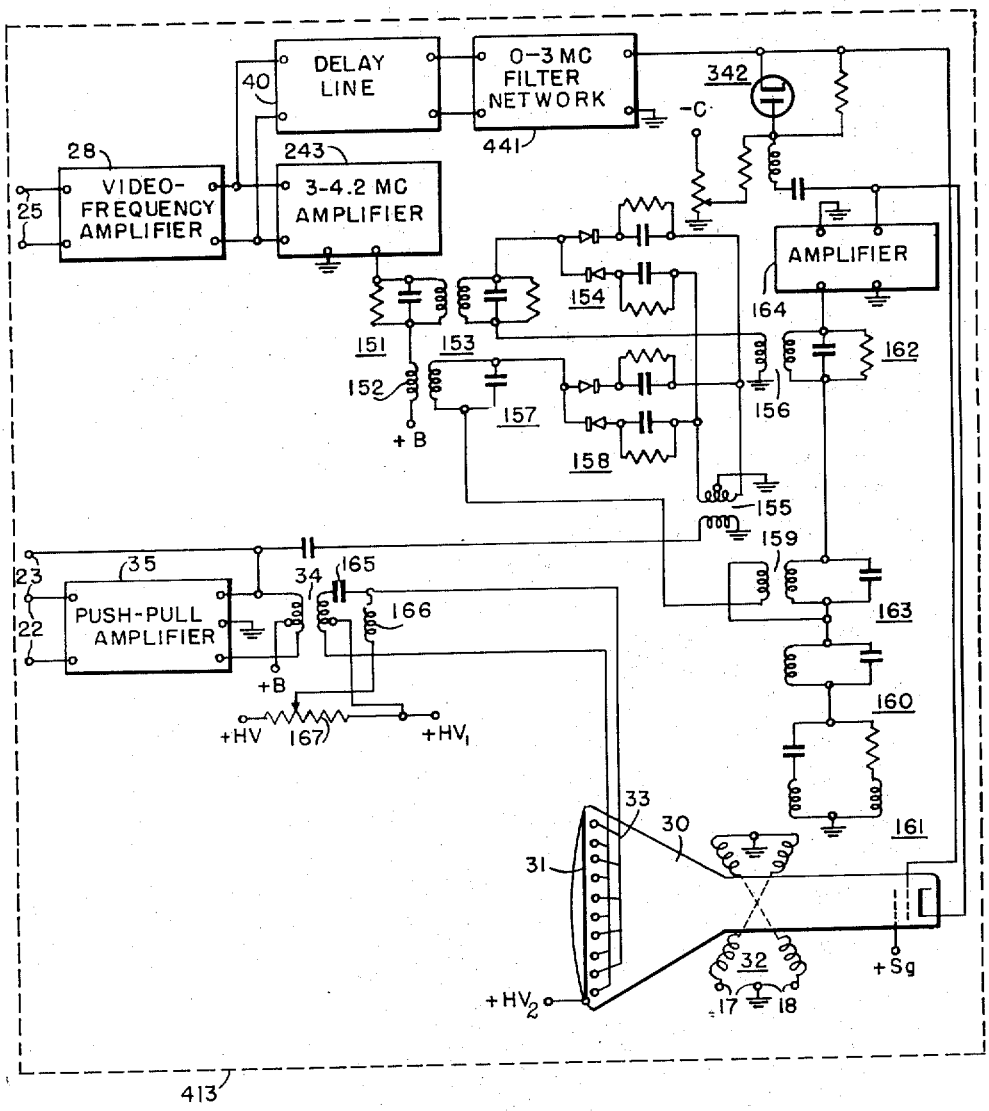
Figure 5:
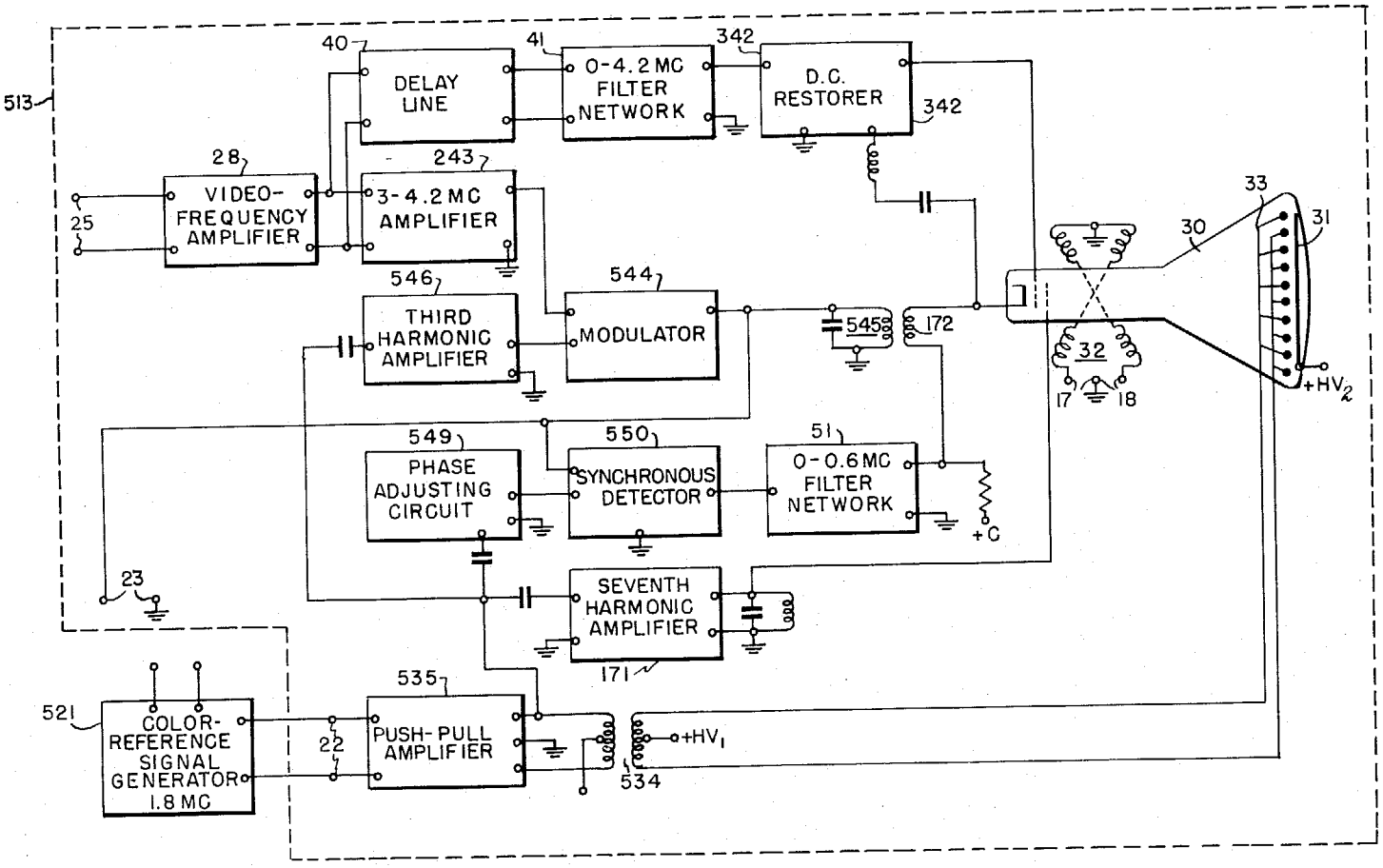

Figs. 1c–1h, inclusive, 1k, 1m, and 1n are explanatory diagrams utilized in explaining the operation of the system of Fig. 1b;

Fig. 2 is a circuit diagram, partially schematic, of a modified form of the image-reproducing system of Fig. 1;

Fig. 3 is a circuit diagram, partially schematic, of another form of the image-reproducing system;

Fig. 4 is a schematic diagram of another modified form of the image-reproducing system;

Fig. 4a is a vector diagram utilized in explaining the operation of the system of Fig. 4, and Fig. 5 is a schematic diagram of still another modified form of the image-reproducing system.

General description of receiver of Fig. 1

Referring now to Fig. 1 of the drawings, there is represented a color-television receiver of the superheterodyne type such as may be used in a color-television system of the type previously discussed herein and in the aforesaid Eletronics article. The receiver includes a carrier-frequency translator 10 having an input circuit coupled to an antenna system 11. It should be understood that the unit 10 may include in a conventional manner one or more stages of wave-signal amplification, an oscillator-modulator, and one or more stages of intermediate-frequency amplification if such are desired. Coupled in cascade with the output circuit of the unit 10, in the order named, are a detector and automatic-gain-control (AGC) supply 12, and an image-reproducing system 13 constructed in accordance with the present invention and to be described more fully hereinafter.

An output circuit of the detector 12 is coupled through a synchronizing-signal separator 14 to a line-scanning generator 15 and a field-scanning generator 16, output circuits of the latter units being coupled, respectively, through the pairs of terminals 17, 17 and 18, 18 to line-deflection and field-deflection windings of the image-reproducing apparatus in the image-reproducing system 13. Additionally, an output circuit of the separator 14 and of the generator 15 are coupled through a gated color burst signal amplifier 19 and a phase-control system 20, in cascade, to a color reference-signal generator 21 for developing a 3.6 megacycle sine-wave signal. The output circuit of the generator 21 is coupled through a pair of terminals 22, 22 to a push-pull amplifier in the image-reproducing system 13, and an input circuit of the phase-control system 20 is coupled through another pair of terminals 23, 23 to the aforementioned push-pull amplifier. The amplifier 19 may be of a conventional gated type for periodically translating a color burst synchronizing signal during its occurrence, and the phase-control system 20 may be a conventional automatic-phase-control system for utilizing a color burst synchronizing signal to control the frequency and phase of the signal developed by the generator 21.

The AGC supply of the unit 12 is connected through the conductor identified as AGC to input terminals of one or more of the stages in the unit 10 to control the gains of such stages to maintain the signal input to the detector 12 within a relatively narrow range for a wide range of received signal intensities. A sound-signal reproducing system 24 is also connected to an output circuit of the unit 10 and it may include stages of intermediate-frequency amplification, a sound-signal detector, stages of audio-frequency amplification, and a sound-reproducing device.

It will be understood that the various units and circuit elements thus far described with the exception of the image-reproducing system 13 may be of conventional construction and design, the details of such units being well known in the art and require no further description.

General operation of receiver of Fig. 1

Considering briefly now the operation of the receiver of Fig. 1 as a whole and assuming the image-reproducing system 13 to be of a conventional type such as described in the aforesaid Electronics article, a desired composite television signal of the NTSC type is intercepted by the antenna system 11, 11, is selected, amplified, and converted to an intermediate-frequency signal and further amplified in the unit 10 and the video-frequency modulation components thereof are derived in the detector 12 to develop a composite video-frequency signal of the NTSC type. The latter signal comprises synchronizing components, the aforementioned subcarrier wave signal or chromaticity signal, and the aforementioned luminance or brightness signal. The derived video-frequency signal is applied through a pair of terminals 25, 25 to the image-reproducing system 13.

The synchronizing components including line-frequency and field-frequency synchronizing signals as well as the aforementioned color burst signal for synchronizing the operation of the generator 21 are separated from the other video-frequency components and at least some of such synchronizing signals are separated from each other in the synchronizing-signal separator 14. The line-frequency and field-frequency synchronizing components are applied, respectively, to the units 15 and 16 to synchronize the operation thereof with the operation of related units at the transmitter. These generators supply signals of saw-tooth wave form which are properly synchronized with respect to the transmitted signal and are applied to the line-deflection and field-deflection windings of the color image-reproducing apparatus in the system 13 to effect a rectilinear scanning of the image screen of the picture tube in such system. The color burst signal, which is substantially a few cycles of an unmodulated portion of the aforementioned subcarrier wave signal and has a desired reference phase with respect to such subcarrier wave signal, is translated through the amplifier 19, when such amplifier is gated on by a line-retrace signal from the generator 15 during the line-blanking period and is applied to the phase-control system 20 to control the frequency and phase of the signal developed in the generator 21.

In the image-reproducing system 13, as will be described more fully hereinafter, the information representative of the different primary color images is derived from the composite video-frequency signal applied thereto from the output circuit of the detector 12 and is utilized to modulate the intensity of the electron beam in the picture tube in the system 13. This intensity modulation together with other controlling of the beam in the picture tube results in the excitation of the different color phosphors therein in coincidence with the occurrence of information representative of the corresponding ones of the different primary colors to reproduce three primary color images. These primary color images are optically combined to reproduce the complete color image.

The automatic-gain-control or AGC signal developed in the unit 12 is effective to control the amplification of one or more of the stages in the unit 10 thereby to maintain the signal input to the detector 12 and to the sound-signal reproducing system 24 within a relatively narrow range for a wide range of received signal intensities. The sound-signal modulated wave signal, having been selected and amplified in the unit 10, is applied to the sound-signal reproducing system 24. Therein it is amplified and detected to derive the sound-signal modulation components which may be further amplified and then reproduced in the reproducing device of the system 24.

Description of image-reproducing system of Fig. 1

In describing the image-reproducing system 13 of Fig. 1, the combination of the units thereof comprising the complete system will first be considered with reference to Fig. 1 and then the details of specific embodiments of such units will be considered with reference to Fig. 1b. The image-reproducing system of Fig. 1 comprises a circuit for supplying an NTSC signal including a first component primarily representative of the brightness and a subcarrier wave signal representative of the chromaticity of a televised image. More specifically, such circuit comprises a video-frequency amplifier 28 having an input circuit coupled to the pair of terminals 25, 25. The NTSC type of signal is such as has previously been described herein and the subcarrier wave signal is one which has been modulated at the transmitter at different phase points thereof by signals representative of the chromaticity of the image. More specifically, such subcarrier wave signal has successive cycles modulated at phase points in each cycle by signal components representative of hue so that the cycles have substantially the same phase-hue characteristics. These cycles are also modulated in amplitude by components representative of the color saturation of successive elemental areas of the televised color image. More complete details of such signal are discussed in the aforementioned Electronics article.

The image-reproducing system also comprises a color image-reproducing apparatus, specifically, apparatus 29 including a cathode-ray tube 30 having a multicolor image screen 31 and means for scanning the screen with an electron beam, the scanning means including means for conditioning the apparatus 29 to develop a plurality of colors in a sequence repeating at a predetermined frequency and in which one of the component colors occurs twice. More specifically, the means for scanning the screen with an electron beam includes a conventional electron gun in the cathode-ray tube, conventional line- and field-deflection windings 32, and a grid-like structure 33 parallel to and spaced a short distance from the screen 31 between the electron gun and the screen and having the grid wires thereof coupled through a transformer 34 to the output circuit of a push-pull amplifier 35. The elements 33, 34, and 35 comprise means for conditioning the apparatus 29 to develop a plurality of colors in a sequence repeating at a predetermined frequency, in a manner to be explained more fully hereinafter. More specifically, the picture tube 30 is a single-gun type such as described in the aforesaid IRE article. The image screen 31 is more fully represented in Fig. 1a and includes repeating groups of three parallel strips of different phosphors individually for emitting the green, red, and blue colors indicated. The grid structure 33 comprises a plurality of conductors which are parallel to each other and the phosphor strips on the screen 31, one of such conductors being positioned between each of the phosphor strips for emitting red and blue colors and the electron gun of the tube 30, there being no such conductors similarly positioned with respect to the phosphor strips for emitting green. The conductors adjacent the strips for emitting red are connected together and to one side of the winding of the transformer 34 while those adjacent the phosphor strips for emitting blue are also connected together and to the other side of such winding.

The image-reproducing system 13 of Fig. 1 also comprises, signal-modifying apparatus coupled to the aforesaid supply circuits, specifically, to the amplifier 28 for translating the modulated subcarrier wave signal at a predetermined phase with respect to the above-mentioned sequence of colors developed on the image screen of the image-reproducing apparatus 29 and for deriving from the subcarrier wave signal a modulated wave signal differing in frequency therefrom and which is a harmonic of the above-mentioned predetermined frequency and has a predetermined phase with respect to the aforesaid sequence. More specifically, such signal-modifying apparatus effectively includes a first signal-translating channel, specifically, a delay line 40, a 0–4.2 megacycle filter network 41, and a direct-current restorer 42 connected in cascade in the order named between the output circuit of the amplifier 28 and the control electrode of the picture tube 30. The units 40, 41, and 42 comprise the channel for translating the aforesaid modulated subcarrier wave signal at a predetermined phase, to be discussed more fully hereinafter, with respect to the sequence in which the colors are developed on the image screen 31 of the tube 30, and further are the channel for translating the brightness or luminance signal for application to the tube 30.

The signal-modifying apparatus also includes a second signal-translating channel, specifically, a channel including a 3.0–4.2 megacycle filter network 43, a modulator 44, and a 6.6–7.8 megacycle filter network 45 connected in cascade, in the order named, between the output circuit of the amplifier 28 and the cathode of the picture tube 30. The second signal-translating channel also includes a third harmonic amplifier 46 coupled between an output circuit of the push-pull amplifier 35 and an input circuit of the modulator 44 for developing a signal, the frequency of which is approximately 10.8 megacycles or the third harmonic of the 3.6 megacycle signal developed in the output circuit of the amplier 35.

The signal-modifying apparatus may also include a second harmonic amplifier 47 for developing gating signals which are the sixth harmonic of the 3.6 megacycle signal developed in the output circuit of the amplifier 35, that is, which have a frequency of approximately 21.6 megacycles for application to the screen electrode of the picture tube 30. The circuit connecting the output circuit of the amplifier 47 to the screen electrode of the picture tube 30 includes a switch 48 for selectively making such connection. The signal-modifying apparatus may also include a phase-adjusting circuit 49, a synchronous detector 50, and a 0–0.6 megacycle filter network 51 connected in cascade, in the order named, between an output circuit of the push-pull amplifier 35 and an input circuit of the filter network 41 for developing luminance correction signals for combination with the received luminance signals to develop a luminance signal suitable for use in the picture tube 30. An input circuit of the synchronous detector 50 is coupled to an output circuit of the band-pass amplifier 43 for applying the modulated subcarrier wave signal to the unit 50. The units 49, 50, and 51 comprise a circuit for developing an M—Y correction signal where M represents a dot-sequential type of brightness signal and Y represents a constant-luminance type of luminance signal, such circuit being more fully described hereinafter and in applicant's copending application, Serial No. 339,145, entitled "Color-Television Receiver."

Description of circuit details of units of the image-reproducing apparatus 13 of Fig. 1 as represented by Fig. 1b.

Having described the combination of units comprising the image-reproducing apparatus 13 of Fig. 1, the circuit details of one embodiment of such apparatus will now be considered with reference to Fig. 1b. To correlate the units of Figs. 1 and 1b, the numerals designating the units of Fig. 1 are utilized to designate dashed-line boxes representing the corresponding units in Fig. 1b.

In the embodiment of Fig. 1b, the video-frequency amplifier 28 comprises a pentode 60 having the control electrode thereof coupled through a voltage divider 61 to the pair of input terminals 25, 25 and the cathode thereof coupled through a saturation control circuit to ground. The saturation control crciuit includes a load resistor 62 and a parallel-tuned circuit 63, resonant at approximately 3.6 megacycles, connected in series between the cathode and ground and in parallel with a series-connected circuit of a condenser 64, an inductor 65, and a tapped portion of an adjustable resistor 66. The condenser 64 and inductor 65 comprise a series-tuned circuit resonant at approximately 3.6 megacycles. The anode of the tube 60 is coupled through the delay line 40 and the filter network 41 to a source of potential +B. The network 41 includes in series a parallel-tuned circuit 67 and a resistor 68, the circuit 67 being proportioned to effect peaking for the higher frequency signals of the 0–4.2 megacycle band. The anode of the tube 60 is also coupled through the delay line 40 and a condenser 69 in the network 41 to the intensity control electrode of the picture tube 30, the direct-current restorer 42 being shunted across the input circuit to such control electrode.

A condenser 70 and resistor 71 coupled in series between the anode of the tube 60 and ground, and with the junction of such elements connected to the control electrode of a tube 72 in the modulator 44, comprise a conventional filter network 43 proportioned to translate substantially a 3.0–4.2 megacycle signal to such electrode. The control electrode of such tube is also coupled through a pair of series-connected coupling condensers 73 and 74 to the anode of a tube 75 which is included in the third harmonic amplifier 46. The cathode of the tube 72 is connected to ground while the anode thereof is connected through a load resistor 78 to a source of potential +B, is further connected through a series-tuned circuit resonant at 10.8 megacycles to ground and through the band-pass or 6.6–7.8 megacycle filter network 45 to the cathode of the picture tube 30. A parallel-resonant circuit 79 in the network 45 is broadly tuned to approximately 7.2 megacycles and is conductively coupled to a voltage divider 80 connected between the source of potential +B and ground, the latter divider comprising a brightness control for applying a unidirectional potential to the cathode of the tube 30.

The anode circuit of the tube 75 in the third harmonic amplifier 46 includes parallel-tuned load circuits 76 and 77 resonant at the third harmonic of the aforesaid 3.6 megacycle signal developed in the output circuit of the push-pull amplifier 35. The cathode of the tube 75 is connected to ground and the control electrode thereof is coupled through a coupling condenser 81 to an output circuit of the push-pull amplifier 35. To obtain tripling of the 3.6 megacycle signal applied to the control electrode of the tube 75, a properly proportioned biased resistor 82 is coupled between the control electrode and ground. The anode circuit of the tube 75 is also coupled to the second harmonic amplifier 47, specifically, through a coupling condenser 83 in the unit 47 to the control electrode of a triode 84 therein. The anode of the triode 84 is coupled to the screen electrode of the picture tube 30 and through a parallel-tuned circuit 85, resonant at approximately 21.6 megacycles, to a source of potential +B while the cathode of the triode 84 is coupled through the switch 48 to ground.

An output circuit of the push-pull amplifier 35 is also connected through the phase-adjusting circuit 49, specifically, through a pair of series-connected coupling condensers 86 and 87 in the unit 49 to the control electrode of a triode 88 in the synchronous detector 50. The phase-adjusting circuit 49 also includes a parallel-tuned circuit 89 resonant at approximately 3.6 megacycles and coupled between the junction of the condensers 86 and 87 and ground. The control electrode of the triode 88 is also coupled through a high-pass filter network 43a to the anode circuit of the amplifier 28 and the anode thereof is coupled through the low-pass filter network 51 to the filter network 41.

Explanation of operation of image-reproducing apparatus 13 of Figs. 1 and 1b

In considering the operation of the apparatus 13 of Figs. 1 and 1b, it will be helpful in understanding such operation initially to give some consideration to the need for such apparatus. Basically, such need arises because of the structural and operational differences between a picture tube, such as the three-gun color tube described in the aforesaid Electronics article and which simultaneously reproduces the component colors of an elemental area of an image and the single-gun tube, such as represented in Figs. 1 and 1b and which sequentially reproduces such component colors. The NTSC signal, though not limited to utilization with apparatus for simultaneously reproducing component colors, readily lends itself to such utilization as described in the aforementioned Electronics article. This facility of utilization arises from the employment of color-signal deriving apparatus external to the picture tube and separate channels for applying the different color signals to the picture tube. However, when sequential reproduction of the component colors in an elemental area of the image is employed as in the single gun picture tube considered herein, the primary colors are reproduced in some time order, or in other words, in some time sequence by the one electron beam. In employing such operation, it is axiomatic that as the beam sequentially excites the different phosphors to reproduce the different colors, the signal representing the colors of the image to be reproduced applied to an intensity control electrode in the picture tube should sequentially include color information in phase with the sequence of the colors being reproduced by means of the beam. If such color information is not included in the applied signal in proper timing with the development of the different colors by the beam, then at least the colors in the image being reproduced do not correspond to the colors of the televised image.

A consideration of Fig. 1c will assist in understanding the type of cooperation required in a tube such as the tube 30 of Fig. 1 between the signal which intensity modulates the electron beam and the impinging of the electron beam on the different phosphors. The phosphor strips represented in Fig. 1c comprise a portion of the total area of the image screen 31 of the picture tube 30 and reproduce, when excited by the electron beam, the colors indicated, the letters G, R, and B representing the colors green, red, and blue, respctively. Actually the representation of Fig. 1c is incomplete since conductors of the grid 33 in the tube 30 of Fig. 1b should be represented as horizontal wires spaced above the phosphors in the plane of the paper and vertically alined on the R and B phosphors. For simplicity of representation such conductors are not shown but are assumed to be present. In the apparatus 13 of Fig. 1b, a 3.6 megacycle color-switching signal is applied by the output circuit of the amplifier 35 to the two sets of conductors of the grid 33 of the picture tube 30 causing the electron beam to trace a path such as represented by the sine wave in Fig. 1c during each cycle of such applied signal and along a fraction of each horizontal line of scan. That is, if it is assumed that the cycle starts in the lower left portion of a phosphor G, the beam first develops a green light, next a red light, again a green light, and finally a blue light during the one cycle. The sequence of colors reproduced during this one cycle is GRGB, includes green twice and repeats at a 3.6 megacycle rate along each line of scan. This means that if the 3.6 megacycle subcarrier wave signal modulated by the color information in the manner previously considered herein is in phase with the 3.6 megacycle color-switching signal applied to the grid 33 and which causes the beam to trace the path represented in Fig. 1c and such modulated subcarrier wave signal is directly applied to an intensity control electrode of the beam, then such subcarrier wave signal should include in each cycle therof color information such that during an initial small angle of the cycle the information would represent green, during a wider angle of the cycle the information would represent red, during another small angle it would represent green, and finally during another wide angle it would represent blue. The NTSC type of subcarrier wave signal does not include color information in such sequence or with such phase-angle relationships. Therefore, in order to utilize the NTSC subcarrier wave signal with a picture tube such as the tube 30 the wave signal should be modified. The unit 13 of Fig. 1b effects such modification. The degree and type of such modification will be better understood by initially considering the composition of the NTSC signal and of a comparative dot-sequential type of signal which may be utilized with the tube 30 of Fig. 1b without modification.

Figure 1E:
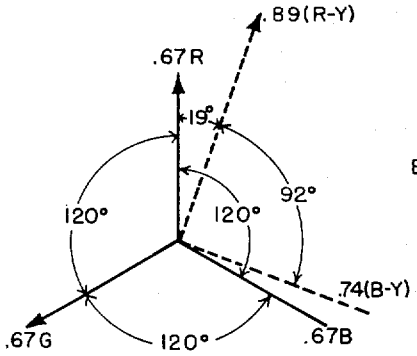

Referring now to Figs. 1d and 1e, the solid straight lines in Fig. 1d represent the vector relationship of the green, red, and blue color components in a cycle of an NTSC type of subcarrier wave signal. Similarly, the solid straight lines in Fig. 1e represent the vector relationship of similar components in a dot-sequential type of signal such as described in "General Description of Receivers for the Dot-Sequential Color Television System Which Employ Direct-View Tri-Color Kinescopes" in the RCA Review for June 1950. It is apparent that the color components in the NTSC type of color-television signal are not symmetrically disposed in phase with relation to each other in a cycle of the subcarrier wave signal and are also not equal in intensity whereas the corresponding components in the dot-sequential type of signal are symmetrically disposed at intervals of 120° in phase and are equal in intensity. If a dot-sequential type of signal is applied to an intensity control electrode of the picture tube 30 so that the green component thereon is in phase with the initial green component in the trace of the electron beam through one cycle as represented by Fig. 1c, then by employing a gating signal for the beam, the beam may be made to excite the phosphors at 120° intervals along each cycle of trace. The portions of the phosphors excited during the gating periods are represented by the circles positioned along the sine wave in Fig. 1c. By proper phasing of the gating signal the 3.6 megacycle signal controlling the positioning of the beam on the image screen and the dot-sequential signal applied to an intensity control electrode of the tube, the green, red, and blue phosphors can be excited in phase with the green, red, and blue components symmetrically disposed on a cycle of the applied dot-sequential type of subcarrier wave signal. However, such gating cannot be employed with the NTSC signal to give high fidelity color reproduction since, as represented by Fig. 1d, the color components are not at 120° phase intervals or of equal intensity. However, an NTSC signal may be modified so as to be similar to a dot-sequential signal, and thus be suitable for use with the tube 30 of Fig. 1b.

One form of apparatus for modifying an NTSC type of signal so that it is the equivalent of a dot-sequential signal and therefore suitable for use with the tube 30, provided properly phased third harmonic gating of the modified signal is employed, has been described in the above-mentioned copending application. To understand such modification it is helpful to define the compositions of the NTSC and dot-sequential signals.

The monochrome or brightness component Y in the NTSC signal is defined as follows:

$$Y=.59G+.30R+.11B \qquad (1)$$

whereas the corresponding component M of a dot-sequential signal is defined as follows:

$$M=.33G+.33R+.33B \qquad (2)$$

The chrominance or modulated subcarrier wave signal of the NTSC signal may be defined in terms of its quadrature modulation components as $R-Y/1.14$ and $B-Y/2.03$. The latter components are representative of the red and blue color-difference signals, respectively, and are represented by the dashed-line vectors of Fig. 1d. The subcarrier wave signal may also be defined by the aforementioned G, R, and B modulation components thereof represented by the solid-line vectors of Fig. 1d. In a similar manner, the modulated subcarrier wave signal of a dot-sequential type of signal may be defined in terms of the three color components G, R, and B represented by the solid-line vectors of Fig. 1e or may be defined in terms of the quadrature modulation components $.89(R-Y)$ and $.74(B-Y)$ represented by the dashed-line vectors thereof.

In the apparatus described in the copending application, the brightness signal Y, defined by Equation (1) above, is modified to be the equivalent of the brightness signal M, defined by Equation (2) above, by deriving a luminance correction signal $M-Y$ from the modulated subcarrier wave signal. The phase-adjusting circuit 49, the synchronous detector 50, and the filter network 51 in Fig. 1b operate to derive such correction signal for combination with the signal Y in the network 41 to develop the desired signal M. As described and explained in the copending application, at a predetermined phase angle of the subcarrier wave signal an M—Y correction signal may be derived, a phase angle of 19°, where the phase axis for the B—Y modulation component thereof is considered 0°, being the proper angle for the signal being considered. The circuit 49 adjusts the signal applied thereto from the amplifier 35 so it has such an angle of 19° with respect to the modulated subcarrier wave and the latter wave signal heterodynes with the phase-adjusted reference signal in the unit 50 to derive the M—Y signal. For proper modification of the signal Y the derived M—Y signal should have an intensity of approximately .58 with respect to the intensity of the signal Y when they are combined and the units 50, 51, and 41 are proportioned to effect the required attenuation.

In the apparatus described in the copending application, the NTSC type of subcarrier wave signal is also modified to be similar to the dot-sequential type of wave signal. As described in such application, the modulated NTSC type of subcarrier wave signal is heterodyned with a second harmonic reference wave signal properly adjusted in phase and intensity with respect to the modulated NTSC signal, to develop a dot-sequential type of 3.6 megacycle modulated wave signal. In other words the heterodyning of the fundamental and second harmonic signals effectively causes the vectors R—Y/1.14 and B—Y/2.03 of Fig. 1d to be modified in relative intensity so they are the equivalent of the vectors .89(R—Y) and .74(B—Y), respectively, of Fig. 1e on the resultant 3.6 megacycle wave signal. The phasing and intensity of the second harmonic signal is such as to effect the desired increase in the magnitude of the B—Y vector relative to the R—Y vector. The phasing of the modified signals becomes that of the R—Y and B—Y signals if a new reference phase is employed.

Such modification of the NTSC signal so that it is the equivalent of a dot-sequential signal, as described in the copending application, does provide a modified NTSC signal suitable for use with a picture tube such as the tube 30 of Fig. 1b. The conversion of Y to M does not destroy the constant-luminance characteristic of Y since the modification can be considered as a luminance correction of the Y signal to cause the modified Y signal to cancel the luminance changes which would otherwise result from the modulated subcarrier when utilized in the single-gun tube. However, such correction is only a first order one since the gamma of the picture tube and other nonlinear signal-translating characteristics of the different channels have not been considered. The modification of the NTSC subcarrier wave signal results in colorimetric reproduction equivalent to that available with the aforementioned three-gun tube. However, the utilization of third harmonic gating tends to decrease the efficiency of reproduction because the phosphors are only excited by the beam during the short gating intervals with a maximum of a fifty percent duty cycle. In addition, the exciting of a small area of each phosphor at a 3.6 megacycle rate tends to develop undesired crawling patterns in the reproduced image. It is preferable that the beam should not be gated so that all of the beam energy is employed in exciting the phosphors. The apparatus 13 of Fig. 1b effects such result in a manner now to be explained.

Initially in explaining the operation of the apparatus 13 of Fig. 1b in modifying the NTSC signal so that it may be utilized with the picture tube 30, it will be helpful to consider again the sine-wave path of the beam as represented in Fig. 1c. To simplify the explanation of the manner in which gating may be dispensed with it is helpful to explain first what happens as the width of the gates is increased and then deduce from the results obtained what occurs as such gates overlap. It is helpful in considering the gate widening first to assume that the gating frequency is double so as to occur at 60° intervals, and then note what occurs as two adjacent such gates are made into one. When gating at 60° intervals, the phosphors will be excited in the sequence GRRGBB during the cycle as represented by the combination of the dashed-line and solid-line circles in Fig. 1c, and, if two cycles are considered, this sequence becomes GRRGBBGRRGBB. In the latter two-cycle path, if a sequence is assumed to start with the second R, then a complete sequence is RGBBGR and this sequence is cyclically repeated at the 3.6 megacycle frequency of the color-switching signal applied to the grid structure 33. It should be noted that in such sequence there are two reversed sequences, namely, RGB and BGR. Use is made of this relation in developing a modified NTSC signal to be used without gating.

The composite effect resulting from the combination of the one sampling effected by the gating signal at one 60° point and the signal applied to an intensity control electrode of such tube may be considered as a resultant heterodyne signal and such combining or heterodyning operation may be analyzed in terms of a Fourier series. If the applied subcarrier wave signal is designated E and the components of the sampling pulse is defined as a composite sginal S, the signal S may be defined as follows:

$$S=1+2m_1 \cos(\omega t+\theta_1)+2m_2 \cos(2\omega t+\theta_2)+ \quad (3)$$

and the resultant heterodyne signal H caused by the combination of the pulse sample and the signal E is then defined as follows:

$$H=E+2m_1E \cos(\omega t+\theta_1)+2m_2E \cos(2\omega t+\theta_2)+ \quad (4)$$

In the above equations, the m's represent intensity factors and the $\theta$'s represent the relative phase relations. In Equation (4), the first term indicates that the applied signal E is directly translated with unity gain, the second term indicates that synchronous detection of the applied signal E occurs at the fundamental sampling frequency with a gain of $m_1$ and at a phase angle of $\theta_1$ with respect to the reference angle of the cosine function, and the third term indicates that synchronous detection of the applied signal E occurs at the second harmonic sampling frequency with a gain of $m_2$ and a phase angle of $\theta_2$.

Figure 1F:
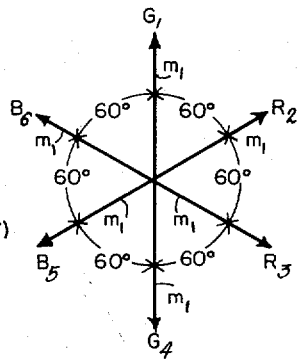
Figure 1G:
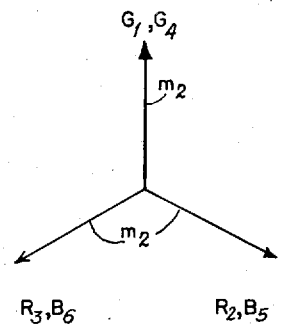

Relating this analysis to a sampling operation which includes gating at 60° intervals as previously discussed, the effect of each such sampling is to translate the monochrome or brightness signal, synchronously to detect any signal at the fundamental sampling or color-switching frequency into six components as represented by the vectors of Fig. 1f, and synchronously to detect any signal which is a second harmonic of the sampling frequency into three components for each cycle of the second harmonic signal, or six components for each cycle of the sampling signal, the latter six components being represented by Fig. 1g.

In considering the vectors of Fig. 1f, it should be noted that the 60° gating causes the aforementioned sequence of colors GRRGBB, as indicated by the subscripts of the letters representing the colors, to be obtained. However, in Fig. 1g where the second harmonic signal is being gated at 60° intervals of a fundamental signal, the gating is actually 120° gating on two cycles of the second harmonic signal and results in the same color sequence GRRGBB but with only the green components at the same phase in both cycles of the second harmonic signal. The red and blue components are interchanged in the two cycles.

In the vector diagrams of Figs. 1f and 1g, the detection action of the tube for green is assumed to be at a phase angle of 90°, that is, it is assumed to be in phase with a cosine function, or, in other words, the color-switching signal is a sine wave at 0° phase and may be represented as a vector at 0°, and the gating signal is assumed to be symmetrical so that $\theta_2=2\theta_1$ for each sampling operation.

Figure 1H:
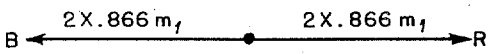
Figure 1K:
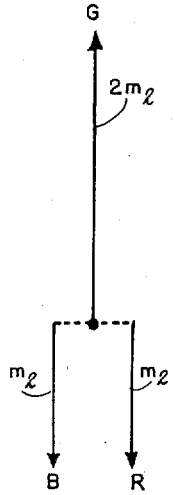

Considering Figs. 1h and 1k, it should be noted that the net detection action resulting from the excitation of the red and blue phosphors at the fundamental frequency are equal and opposite along the 0°–180° axis and that the net detection action for green resulting from sampling at the fundamental frequency is 0. The vectors of Fig. 1h represent such resultant detection action and it should be noted that the resultants R and B, because of the trigonometric relations of the $B_5$, $B_6$ and $R_2$, $R_3$ vectors in Fig. 1f, have magnitudes of $2\times.866m_1$. In considering the gating of the second harmonic signal, the net red and blue signals are equal and at 270° phase while the net green signal is equal to twice the red or blue signals derived and is at 90° phase. The vectors of Fig. 1k represent such relationship, the B and R vectors being represented as being displaced from the origin for simplicity of representation. Actually such vectors should be represented in coincidence in angular position.

From an analysis of the above, it then follows that, when employing sixth-harmonic gating, effectively derivation of the color signals occurs only along one axis, that is, the 0°–180° axis with respect to the fundamental subcarrier wave-signal frequency and along only one axis, that is, the 90°–270° axis with respect to a second harmonic subcarrier wave signal. In other words, if the NTSC subcarrier wave signal is directly utilized in combination with sixth-harmonic gating in which the color-switching frequency is equal to the mean frequency of the NTSC subcarrier wave signal only a two-color picture should result. That is, as represented by Fig. 1h, there should be no derivation of signals representative of green. In order to derive the green components, the second harmonic of the NTSC subcarrier wave signal should also be applied to the picture tube. Actually, since the operation of a single-gun picture tube is nonlinear in that it has some gamma, some detection of the signals representative of green from the fundamental NTSC subcarrier wave signal does result though such detection is not phase sensitive and consequently a desaturated green would be reproduced regardless of the phase direction of the green component along the 90°–270° axis. However, the nonlinear signal derivation results just considered may be ignored if a relatively simple modifying apparatus is desired in which the results of such nonlinear signal derivation are minimized.

If it is assumed that the effective sampling operation effected in the tube 30 of Fig. 1b has fundamental and second harmonic components of amplitudes $2m_1$ and $2m_2$, respectively, relative to a unidirectional component of unity, as previously discussed herein with reference to Equations (3) and (4), then by analyzing the vector diagrams of Figs. 1h and 1k, the first order solution of the color-signal detection efficiency in the tube can be evaluated for each primary color. The results of such analysis are tabulated below and are expressed in such table in relation to an arbitrary selection of unity translation for the monochrome component. In other words, all of the vector magnitudes represented in Figs. 1h and 1k have been divided by two since the monochrome translation, previously considered as being unity for one sampling, for each pair of green, red, or blue samples is two.

| Primary Color | Monochrome Component | Fundamental | | Second Harmonic | |
|---|---|---|---|---|---|
| | | Cosine | Sine | Cosine | Sine |
| Green | 1 | 0 | 0 | $m_2$ | 0 |
| Red | 1 | 0 | $.866m_1$ | $-.5m_2$ | 0 |
| Blue | 1 | 0 | $-.866m_1$ | $-.5m_2$ | 0 |

If, with respect to the above table, the amplitude of the sine component of the fundamental is considered to be equal to $a_1$, the amplitude of the cosine component of the second harmonic is considered to be equal to $a_2$, and the monochrome component is considered to be equal to M, then the total low-frequency output effects for the three primary colors resulting from the decoding operation in the single-gun tube are as follows:

$$\text{Green}=M+m_2a_2 \quad (5)$$

$$\text{Red}=M+.866m_1a_1-.5m_2a_2 \quad (6)$$

$$\text{Blue}=M-.866m_1a_1-.5m_2a_2 \quad (7)$$

If it is assumed that the desired green, red, and blue outputs signals resulting from the decoding operation in the single-gun tube are G, R, and B, respectively, the resulting equations may be solved for M, $a_1$, and $a_2$ with the following results:

$$M=.33G+.33R+.33B \quad (8)$$

$$.866m_1a_1=.5R-.5B \quad (9)$$

$$m_2a_2=.67G-.33R-.33B \quad (10)$$

From the above, it follows that, as far as first order effects are concerned, correct colorimetric reproduction is obtainable when using a single-gun picture tube such as tube 30 of Fig. 1b if the monochrome component, the fundamental frequency sine component, and the second harmonic cosine component are as defined by the latter three equations, respectively. As far as such first order effects are concerned, it should be noted that the fundamental frequency cosine component and the second harmonic sine component may have any magnitude since they are averaged out in the decoding operation as indicated by the lack of vectors for such components in Figs. 1h and 1k.

To summarize the latter portion of the above consideration, it may be stated that the NTSC signal may be modified for utilization in a single-gun tube such as the tube 30 of Fig. 1b to effect acceptable colorimetric reproduction of a televised image provided four operations are performed with respect to such signal. The first of these is the utilization of a converter such as described in the aforesaid copending application and previously considered herein as being represented by the units 49, 50, and 51 of Fig. 1b for converting the brightness signal Y to the dot-sequential type of brightness signal M. Secondly, the mean frequency of the NTSC subcarrier wave signal applied to an intensity control electrode of the picture tube and the frequency of the color-switching signal applied to the grid structure 33 thereof should be equal and, as indicated by Equation (9), the component of the NTSC subcarrier wave signal along the R—B modulation axis thereof should be in phase with the sine component of the color-switching signal. Next, the NTSC subcarrier wave signal should be heterodyned with either a fundamental or third harmonic signal to develop a modulated second harmonic subcarrier wave signal and the latter should be applied to the intensity control electrode of the picture tube so that the modulation axis along which the G—.5R—.5B component thereof occurs is in phase with the cosine component of the color-switching signal. Finally, the amplitudes of the modulated fundamental and second harmonic wave signals should be proportioned so that the correct color saturation is obtained. Such proportioning is a function of the effective width of the gating angle which determines the magnitudes of the constants $m_1$ and $m_2$. The apparatus 13 of Fig. 1b is designed to perform the four operations just discussed.

Figure 1M:
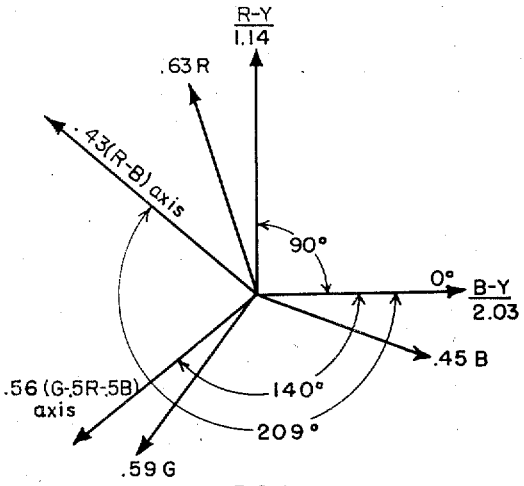
Figure 1N:
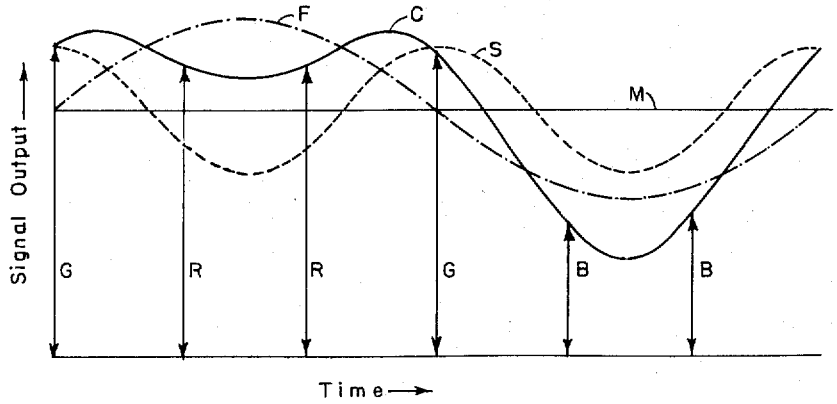
Figure 1A:
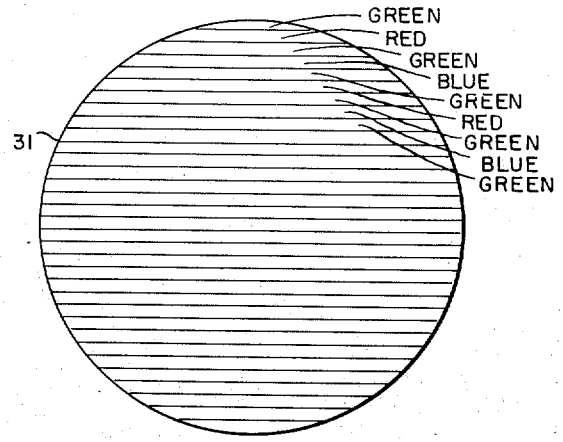

Preliminary to considering the manner in which the apparatus 13 of Fig. 1b performs the four operations just mentioned, it will be helpful in understanding the operation of the unit 13 to explain more fully the phase relations of the fundamental and second harmonic subcarrier wave signals with respect to the color-switching signal. Since the modulation axes R—B and G—.5R—.5B are essential to such consideration, it will initially be helpful to locate such axes on a vector diagram of the fundamental and second harmonic wave signals. Fig. 1m represents such vector diagram indicating that the modulation axis R—B is 209° and the G—.5R—.5B axis is 140°, both clockwise from the B—Y reference axis at 0°. Referring now to Fig. 1c, if the color-switching signal develops the trace cycle represented therein, then the R—B axis of the applied fundamental subcarrier wave signal is in phase with the color-switching signal and the peak of the signal on the G—.5R—.5B axis of the second harmonic signal should occur as the color-switching signal directs the beam onto the green phosphor. The relationship of the fundamental second harmonic and the excitation of the phosphors by a sixth-harmonic gating signal is represented by Fig. 1n. Curve F in this figure represents one cycle of the fundamental subcarrier wave signal as applied to the picture tube 30, Curve S represents two cycles of the second harmonic of such wave signal, and Curve C represents the resultant or composite signal developed from the combination of the fundamental and second harmonic signals. The line M represents the monochrome or brightness signal. In considering Fig. 1n reference should also be made to Fig. 1c and particularly to the six samples represented therein. These samples are represented by the vertical lines GRRGBB of Fig. 1n. It should be noted that the net primary colors for each sample during each of the six gatings is obtained from an average of the fundamental and second harmonic signals modulating the beam during the interval of such sample. The components which are in quadrature during each sample are of opposite sign and thus cancel. The signal relationships represented by Fig. 1n are of the desired type wherein any quadrature components are not present since they cause opposite polarity effects and thus average out over a color-switching cycle. Actually such relationships are not completely developed in the system of Fig. 1 because for reasons discussed above the quadrature components may cause some effects in the system of Fig. 1. However, a system described hereinafter with respect to Fig. 4 does fully develop the signal relationships represented by Fig. 1n.

In Fig. 1b the composite NTSC signal including both the brightness signal Y and the modulated subcarrier wave signal is applied through the pair of terminals 25, 25 and the gain-control resistor 61 to the control-electrode circuit of the tube 60. The cathode circuit of such tube controls the intensity of the modulated subcarrier wave signal with respect to that of the wide-band brightness signal so that proper color saturation may be obtained. Such color saturation is determined by the relative intensities of the brightness and chromaticity signals. The series-resonant network of the condenser 64 and inductor 65 tends to shunt the subcarrier wave signal with respect to the brightness signal, thereby decreasing the degeneration in the cathode circuit and increasing the intensity of such wave signal while the parallel network 63 tends to block translation of the wave signal, thereby decreasing the gain thereof with respect to the brightness signal. The variable resistor 66 combines these opposing effects in the proper proportions to control the relative intensities of the subcarrier wave signal and the brightness signal and thereby to control color saturation.

The composite NTSC signal including the brightness signal and fundamental subcarrier wave signal developed in the output circuit of the amplifier 28 is translated through the delay line 40, the 0–4.2 megacycle filter network 41, and the direct-current potential thereof is restored by the unit 42 prior to application to the intensity control electrode circuit of the picture tube 30. The delay line is proportioned to effect the same time of travel for signals through the units 40, 41, and 42 as is required to translate the chrominance signals through the other channels in the image-reproducing system. As previously explained herein, in order to modify the translated brightness signal so that it is converted to a signal M suitable for utilization with the single-gun picture tube 30, the modulated subcarrier wave signal with side bands between 3.0 and 4.2 megacycles is translated through the filter network 43a and applied to the control-electrode circuit of the triode 88 in the synchronous detector 50. A 3.6 megacycle reference signal developed in the output circuit of the push-pull amplifier 35 is translated through the phase-adjusting circuit 49 and applied after phase adjustment to the control-electrode circuit of the triode 88. The M—Y correction signal is derived by synchronously detecting in unit 50 the NTSC subcarrier wave signal at an angle of +19° counterclockwise where the B—Y axis of modulation is considered 0°. The phase-adjusting circuit 49 effects such control of the 3.6 megacycle signal translated therethrough so that the reference signal effects synchronous detection in the unit 50 of that component of the subcarrier wave signal applied by the unit 43 at the 19° phase point thereof. The detected signal, or M—Y correction signal, is developed in the anode circuit of triode 88. The theory and details of such operation are more fully described in the copending application. The 0–0.6 megacycle band of such correction signal is translated through the low-pass filter network 51 and combined with the Y signal in the network 41 to develop the desired M signal.

As previously discussed, the fundamental NTSC subcarrier wave signal translated through the units 40, 41, and 42 and applied to the control-electrode circuit of the picture tube 30 should have a predetermined phase with respect to the color-switching signal developed from the reference signal in the output circuit of the push-pull amplifier 35 and applied to the grid structure 33 of the picture tube 30. More specifically, it is desired that the color-switching signal be in phase with the R—B axis of the translated NTSC subcarrier wave signal. Conventional phase control of the signal developed in the amplifier 35 may be utilized to control the timing of the color-switching signal as applied to the grid structure 33 to effect such phase relation. If desired such control may be effected in the generator 21 of Fig. 1.

Finally, the amplified subcarrier wave signal developed in the output circuit of the unit 28 is translated through the 3.0–4.2 megacycle filter network 43 and applied to the control electrode of the modulator tube 72. The reference 3.6 megacycle signal developed in the output circuit of the push-pull amplifier 35 and which is phase-controlled with respect to the NTSC subcarrier wave signal by the units 19, 20, and 21 of Fig. 1 is applied to the third harmonic amplifier 46 for developing a 10.8 megacycle signal therefrom. The latter signal is applied to the control electrode of the tube 72 of modulator 44 to heterodyne with the NTSC subcarrier wave signal also applied thereto to develop a modulated second harmonic or 7.2 megacycle subcarrier wave signal in the output circuit of the unit 44. The series-resonant circuit coupled to the anode of the tube 72 shunts the 10.8 megacycle signal incidentally developed in the output circuit of such tube. The second harmonic signal is then translated through the 6.6–7.8 megacycle filter network 45 wherein it is modified in phase so that it has such phase relation to the 3.6 megacycle color-switching signal applied to the grid structure 33 of the picture tube 30 that the phase axis of the modified subcarrier wave signal along which the G—.5R—.5B component occurs is in quadrature phase with the color-switching signal. More specifically, the phase of the second harmonic signal is so adjusted that the peak of the signal on the G—.5R—.5B axis thereof which, as represented by Fig. 1m, is at +140° with respect to the B—Y reference axis, occurs in coincidence with the directing of the beam on the green phosphor by the color-switching signal.

The 3.6 megacycle color-switching signal applied to the grid structure 33 by the amplifier 35 and the transformer 34 causes the electron beam to trace a sine-wave path, such as represented by the sine wave in Fig. 1c, along each horizontal line. The brightness signal and fundamental subcarrier wave signal applied to the control-electrode circuit of the picture tube 30 and the second harmonic subcarrier wave signal applied to the cathode circuit thereof modulate the intensity of the electron beam. As explained above, such modulation in cooperation with the color switching of the beam effects the excitation of the primary colors in accordance with the primary color information on the applied subcarriers and the televised color image is reproduced. For reasons explained more fully hereinafter, sixth-harmonic gating of the electron beam, which may be effected by means of the 21.6 megacycle signal applied to the screen electrode of the tube 30 by the amplifier 47, need not be employed. If employed, the positive peaks of the gating signal should occur at 60° intervals of the color-switching signal. Such phasing may be controlled by the proportioning of the conventional elements in the amplifier 47.

In describing the development of the modified NTSC signal consideration has not been given to maintaining the relative intensities of the chrominance and luminance components, which are in the unmodified NTSC signal developed in the output circuit of the amplifier 28, and in the modified NTSC signal developed for application to the control-electrode circuit of the picture tube 30. If such relative intensities are to be maintained, and such is desirable for more faithful reproduction of the televised image, then, if the gain in the channel including the filter network 41 is assumed to be unity for the luminance signal, the components along the R—B and G—.5R—.5B axes should, respectively, have the magnitudes .43(R—B) and .56(G—.5R—.5B). If narrow-angle sixth-harmonic gating is employed and thus $m_1=m_2=1$, then the filter network 41 or, if desired, the amplifier 28, should be proportional to give approximately a relative gain of 1.35 for the subcarrier wave signal and its side bands and the gain in the channel including the units 44 and 45 should be adjusted to be 1.2 times the unity gain for the luminance signal.

As stated above, the system 13 of Fig. 1 may be operated without sixth-harmonic gating. When no gating is employed, the two areas of the red phosphor excited when such gating is employed merge and effectively become one 120° area. The blue areas similarly merge into one 120° area while the green areas become two 60° areas. If only first order effects are considered, since the positions of the vectors of Figs. 1h and 1k do not change as the gating duration is increased or when gating is not employed, theoretically no color errors should occur and the phosphors should be excited one hundred percent of the time. The values of $m_1$ and $m_2$ would change since for the 60° gates which are effectively present as the color switching traces two 60° paths through each of the green, red, and blue phosphors the intensity of the signal would be averaged over the interval of the gate. It has been found that when no gating signal is employed, $m_1$ is reduced from unity to .96 and $m_2$ from unity to .83. Thus the luminance and chrominance channel gains would change from 1.35 and 1.2 to 1.41 and 1.44, respectively, when no gating is employed.

It should be noted that second and higher order effects would tend to cause some color contamination as gating is dispensed with, such color distortion being caused by the development of components from the signals along the 90°–270° vector axis in Fig. 1k and along the 0°–180° vector axis in Fig. 1h. However, the nonlinear signal-translating characteristic of the electron beam in the tube 30 tends to reduce such color contamination since the gamma of the tube tends to cause less response to low intensity signals and much higher response to signals of greater magnitude thus tending to develop a signal sharpening effect which corresponds to the effect of a narrow gating pulse. As a result, the system 13 of Figs. 1 and 1b does not need a sixth-harmonic gating signal such as developed by the amplifier 47 and the electron beam in the picture tube 30 may be continuously applied to the image screen with an intensity controlled only by the applied luminance and chrominance signals. Such operation of the single-gun picture tube approximately simulates the simultaneous operation of the three-gun tube since, though a 3.6 megacycle color-switching signal is employed, the green phosphor is excited at a 7.2 megacycle rate, being excited twice in each 3.6 megacycle cycle. This results in the reproduction of substantially the equivalent of a simultaneous green image which has a 7.2 megacycle pattern invisible for all practical purposes. Since the eye has less acuity for red and blue detail in the composite picture, the 3.6 megacycle patterns in such colors have relatively minor effects in the composite color image. Consequently, the composite image is, for all practical purposes, the equivalent of a simultaneous image.

To summarize the operation of the image-reproducing apparatus 13 of Fig. 1b, a conventional NTSC type of signal including both monochrome and modulated subcarrier wave signal components is applied to the amplifier 28, wherein saturation control of the subcarrier wave signal is effected, and developed in the output circuit of such amplifier. The luminance and subcarrier wave signal components comprising the composite NTSC signal are translated through the units 40, 41, and 42, the luminance signal being modified in the unit 41 by an M—Y correction signal derived in the synchronous detector 50 and applied as a low-frequency signal to the filter network 41. A properly phased color-switching signal is developed by the amplifier 35 and applied through the transformer 34 to the grid structure 33 of the tube 30 to direct the electron beam therein on the different phosphor strips of the image screen 31 thereof in a cyclic manner such as represented by Fig. 1c but with no gating of the beam. A modulated second harmonic subcarrier wave signal properly phased and controlled in intensity is developed in the unit 44 and applied through the band-pass filter network 45 to the cathode of the picture tube 30. If desired, sixth-harmonic sampling may be effected by applying a signal developed in the output circuit of the unit 47 to the screen electrode of the picture tube 30. Thus, there is developed in the control electrode-cathode circuit of the picture tube 30 a modified NTSC type of signal such as previously discussed herein and which will combine with the color-switching signal applied to the grid structure 33 to reproduce a televised color image.

Description of image-reproducing system of Fig. 2

As discussed with reference to the system 13 of Figs. 1 and 1b, such system is capable of effecting acceptable reproduction of a televised color image as long as higher order signal-translation effects do not become so great as to be disturbing. In other words, as previously mentioned, the modification of the NTSC signal by means of the system 13 of Figs. 1 and 1b is effected only to compensate for first order effects, higher order nonlinear signal-translation effects being considered as negligible. It may be desired to modify the NTSC signal in such manner as also to compensate at least to some degree for higher order effects. The system of Fig. 2 is designed to effect such result.

In the system of Fig. 2, since such system is similar in many respects to that of Figs. 1 and 1b, units which are the same in all such systems are identified by the same reference numerals while units in the system of Fig. 2 which are analogous to units in Fig. 1 are identified by employing the reference numeral of the corresponding unit in Fig. 1 with a factor of 200 added thereto. Units and circuit elements in Fig. 2 which are first described therein are identified by reference numerals between 101 and 130.

The system 213 of Fig. 2 includes in the channel for translating the luminance signal a 0–3 megacycle filter network and a modified form of direct-current restorer 242. A tap on a potential divider 101 coupled between the source of potential +B and ground is connected to the anode of the diode in the direct-current restorer 242 and the potential divider is utilized to effect brightness control in the picture tube 30. The system of Fig. 2 also includes a compensated color-balance signal amplifier 102 coupled to the output circuit of the restorer 242. The amplifier 102 comprises a pentode 103 having the anode circuit thereof coupled through a parallel-tuned circuit 104 to a source of potential +B and also coupled to the screen electrode of the picture tube 30. The circuit 104 is resonant at approximately the mean frequency of the subcarrier wave signal, that is, at 3.6 megacycles. The cathode of the pentode 103 is coupled for unidirectional signals through an adjustable tap on a voltage divider 105 connected between the source of potential +B and ground and utilized to adjust the bias on the cathode. The control-electrode circuit of the tube 103 is connected to an intermediate terminal of a voltage divider 106 coupled between the output circuit of the direct-current restorer 242 and ground. The divider 106 is proportioned to reduce the limits of the voltage range of the signal applied to the tube 103 so such range is within the operating limits of such tube. The screen electrode of the tube 103 is connected to a source of screen-electrode potential +SG and the suppressor electrode thereof is coupled through a phase-adjusting circuit 107 to the output circuit of the push-pull amplifier 235.

In the chrominance channels of the system of Fig. 2, an amplifier 243 having a pass band of 3–4.2 megacycles is utilized in place of the filter networks of Figs. 1 and 1b having a corresponding pass band. In the channel for developing the modified second harmonic signal, there is included a signal-sampling device 108 for effecting translation of only the modulated NTSC signal which corresponds with the G—.5R—.5B axis previously discussed herein with reference to Fig. 1 while shunting out substantially all components along the axis in quadrature thereto. The device 108 comprises a diode 109 having the anode circuit thereof capacitively coupled to the output circuit of the amplifier 243 and coupled through parallel-resonant circuit 110 to ground, the latter circuit being tuned to approximately 3.6 megacycles. The anode of the tube 109 is also connected to an input circuit of the modulator 44 while the cathode thereof is coupled through a biasing circuit 111 in series with an inductor 112 to ground, the circuit 111 being proportioned to bias the cathode with respect to the anode of the tube 109 so that conduction occurs through such tube for substantially only those intervals when the negative peak portions of the signal applied to the cathode occur. The junction of the circuit 111 and the inductor 112 is capacitively coupled to the screen-electrode circuit of the push-pull amplifier 235 which includes a parallel-resonant circuit 113 for developing the 7.2 megacycle signal. The parameters of the tuned circuit 113 are so proportioned that the 7.2 megacycle signal applied to the cathode of the diode 109 has a positive peak during the interval the aforementioned G—.5R—.5B axis of the NTSC signal is being applied to the anode of the diode 109 and its negative peak for the axis in quadrature thereto. The screen electrodes of the tubes in the amplifier 235 are connected to the network 113 so that these tubes act as push-push doublers for the 3.6 megacycle signal being translated therethrough.

The system of Fig. 2 also includes another signal-sampling device 114 including a diode 115 having the cathode thereof capacitively coupled to the output circuit of the amplifier 243 and coupled to ground through a parallel-tuned circuit 116, resonant at 3.6 megacycles. The anode of the diode 115 is coupled through a biasing circuit 117 in series with an inductor 118 to ground, the circuit 117 being proportioned to bias the anode of the tube 115 with respect to the cathode thereof so that such tube is conductive for narrow intervals when the positive peaks of the 7.2 megacycle signal applied to the anode occur. The junction of the circuit 117 and the choke 118 is coupled to the screen-electrode circuit of the amplifier 235 for applying the 7.2 megacycle signal to such junction. The parameters of the tuned circuit 113 cause the 7.2 megacycle signal applied to the anode of the tube 115 to have a definite phase with respect to the NTSC subcarrier wave signal applied to the cathode thereof. More specifically, the phase relation of the applied signals is such that the 7.2 megacycle signal applied to the anode of the tube 115 has a negative peak during the interval the R—B axis of the NTSC subcarrier wave signal is being applied to the cathode thereof.

The output circuit of the modulator 44 comprises a tuned circuit 245 resonant at the second harmonic of the NTSC subcarrier wave signal, specifically, at 7.2 megacycles. The tuned circuits 116 and 245 are inductively coupled to windings 121 and 122, respectively, which are in series between a source of bias potential +C and the cathode of the picture tube 30. The circuit including the tuned circuit 116 and the winding 121 may have the parameters thereof proportioned to effect the proper phase relation between the fundamental NTSC subcarrier wave signal translated therethrough and the color-switching signal applied to the grid 33, as explained with reference to Figs. 1 and 1b. However, other parameters may be adjusted, in a conventional manner, to effect such phase relation. Similarly, the parameters of the circuit 245 and the winding 122 may be proportioned to effect the proper phase relation between the second harmonic subcarrier wave signal and the color-switching signal, as explained with reference to Figs. 1 and 1b.

Explanation of operation of system of Fig. 2

As previously mentioned, the system of Fig. 2 minimizes the effect of the gamma of the picture tube and other nonlinear characteristics in the signal-translating channels by effectively selecting in different channels only the color information along the previously discussed R—B axis and the G—.5R—.5B axis of the 3.6 megacycle NTSC wave signal. The need for selecting only such axes is premised on the recognition that the color-deriving operation of the tube 30 of Fig. 1, when a modified NTSC signal is applied thereto as explained with reference to Figs. 1 and 1b, because of the nonlinear signal translation in such tube derives not only those components in phase in the fundamental and second harmonic signals but also tends to derive some color from the quadrature components of these signals which are, as explained with reference to Fig. 1, of opposite sign and equal intensity voltage-wise in two successive derivations. As voltages such quadrature signals cancel each other but optically they may not do so because of the gamma of the picture tube. To eliminate such quadrature components prior to application of the fundamental and second harmonic subcarrier wave signals to the picture tube, axis selectors as represented by the devices 108 and 114 of Fig. 2 are employed. When such quadrature components are eliminated, the signals in Fig. 1n then accurately represent the operation of the system.

To effect the desired axis selection the NTSC signal is applied by the amplifier 243 through a coupling condenser to the sampling device 114 and the phasing of the 7.2 megacycle signal in the anode circuit of the diode 115 is such that it has a negative peak during each interval the R—B axis of the NTSC subcarrier wave signal is applied to the cathode of the diode 115. The diode 115 becomes conductive during the application thereto of the positive peaks of the 7.2 megacycle signal thereby damping out the components along the axis in quadrature with the R—B axis. The R—B components on the cathode of the diode 115 during the nonconducting period of such diode are developed across the tuned circuit 116 and applied, with proper phasing, through the winding 121 to the cathode of the picture tube 30. The action of the diode 115 is such as to effect translation of the components along the R—B axis of the applied NTSC signal while shunting substantially all components on the axis in quadrature with the R—B axis. Thus the fundamental NTSC signal applied to the tube 30 effectively has only the components along the R—B axis represented by the vectors in Fig. 1h and nonlinear effects in the tube 30 cannot effect rectification or detection of components along a quadrature axis since none of such quadrature components are translated and applied to the picture tube. Similarly, the sampling device 108, because of the previously described phasing of the NTSC wave signal and 7.2 megacycle signal as applied to the diode 109, causes the fraction of the NTSC signal having components along the G—.5R—.5B axis to be applied to the unit 44 while the device 108 effectively shunts the quadrature components of such NTSC signal. Thus, referring to Fig. 1k, only the desired modulation components along the 90°–270° axis are developed on the second harmonic signal in the unit 44. This wave signal, properly phased by the tuned circuit 245 and the winding 122 is also applied to the cathode of the picture tube 30. The luminance signal translated through the unit 241 and applied to the control electrode of the picture tube 30, and the fundamental and second harmonic subcarrier wave signals applied to the cathode thereof combine in such tube to reproduce the color image in the manner described with reference to Figs. 1 and 1b. However, the nonlinear signal-translating characteristics of the tube 30 can no longer cause color contamination by effecting undesired derivations of improper color components at improper times, as explained with reference to Figs. 1 and 1b, and therefore the color fidelity of the system of Fig. 2 is higher than that of Figs. 1 and 1b.

The amplifier 102 in the system of Fig. 2 applies a 3.6 megacycle signal to the screen electrode of the picture tube 30 to effect balancing of the lights emitted by the different phosphors so that such lights will combine to reproduce the different shades of black and white over the total brightness range when a monochrome signal is being received and a monochrome image is being reproduced. It is known that the phosphors for reproducing the different colors do not do so with equal efficiencies. For example, the phosphor for reproducing red is less efficient than those for reproducing green and blue. To compensate for this, the amplifier applies a 3.6 megacycle signal to the screen electrode of the picture tube 30 so that the positive peak thereof occurs in coincidence with the impinging of the beam on the red phosphor. In this way the energy of the beam is increased during the interval the beam is impinging on the red phosphor and compensation for the inefficiency of the phosphor is effected. The network 107 modifies the phase of the signal applied to the tube 103 so it is applied with the proper phase as described above. By means of the voltage divider 106 and the bias control 105 the tube 103 is adjusted to simulate the signal-translating characteristics of the cathode-control electrode circuit of the picture tube 30. In other words, once a proper level for the 3.6 megacycle signal developed in the anode of the tube 103 has been determined for some shade of brightness, the gain of the tube 103 is adjusted so as such shade changes the proper percentage change occurs in the level of such signal to maintain the desired control. In this way adjustments of the brightness control 101 and the D.C. restoration action of the restorer 242 not only adjust the potentials on the electrodes of the picture tube 30 to obtain the desired brightness levels but also effect a similar correction of the intensity of the 3.6 megacycle signal developed in the anode of the tube 103.

Description of image-reproducing system of Fig. 3

The image-reproducing system of Fig. 3 represents a modified form of the axis-selector type of system described with reference to Fig. 2. Since the system of Fig. 3 includes many units which are similar to units in the systems of Figs. 1, 1b, and 2, such units are identified by the same reference numerals. Units in the system of Fig. 3 which are analogous to units of Figs. 1 or 1b are identified by the reference numerals of such analogous units with a factor of 300 added thereto. Units and elements first described in Fig. 3 are identified by numerals in the group 131–150.

In the system of Fig. 3, the direct-current restorer 342 includes a brightness control and is coupled to both the control electrode and cathode of the picture tube 30 to effect D.C. restoration for the signals on both electrodes since in Fig. 3, the M—Y correction signal is applied to the cathode while the brightness signal is applied to the control electrode. The circuit including the triode 131 comprises a composite axis selector or sampling device for both the R—B and the G—.5R—.5B axes of the NTSC subcarrier wave signal. The anode of the triode 131 is coupled through a parallel-tuned circuit 132 to a source of potential +B and to the modulator 44. The cathode of the tube 131 is coupled through a series-resonant circuit comprising an inductor 133 and a condenser 134 to the output circuit of the video-frequency amplifier 28 and through an inductor 138a and a resistor 138b, in series, to ground. The parallel-resonant circuit 132 and the series-resonant circuit 133, 134 are both resonant at approximately the mean frequency of the subcarrier wave signal. The cathode of the tube 131 is also coupled through a biasing resistor 135 to the control electrode of the tube 131. The latter electrode is connected through a condenser 136 to the screen-electrode circuit of the amplifier 235, such screen-electrode circuit including the parallel-resonant circuit 113 described with reference to Fig. 2 and resonant at the second harmonic of the mean frequency of the subcarrier wave signal, that is, at 7.2 megacycles. The output circuit of the video-frequency amplifier 28 is also connected through a resistor 139 to an input circuit of the synchronous detector 50.

The output circuit of the push-pull amplifier 235 is capacitively coupled through a capacitive voltage divider to the screen electrode of the picture tube 30 to effect color balance so that monochrome images may be reproduced over the total brightness range.

Explanation of operation of system of Fig. 3

Except for the operation of the color balancing circuit coupled to the screen electrode of the picture tube 30 and of the axis selector including the triode 131, the system of Fig. 3 operates substantially in the manner explained with reference to the system of Fig. 1. However, in the system of Fig. 3 no sixth-harmonic gating circuit is coupled to the screen electrode of the picture tube 30 and thus no gating occurs and, since the direct-current restorer circuit 342 is coupled to both the cathode and control electrode of the picture tube, direct-current restoration is effected for the luminance and luminance-correction signals on these electrodes.

In considering the operation of the axis selector including the triode 131, it is to be remembered that it is desired to apply a fundamental NTSC subcarrier wave signal including as modulation information substantially only that color information along the R—B axis of the NTSC subcarrier wave signal developed in the output circuit of the amplifier 28. It should also be remembered that the second harmonic modulated wave signal developed from the NTSC subcarrier wave signal applied from the output circuit of the amplifier 28 should include substantially that information along the G—.5R—.5B axis of the latter NTSC subcarrier wave signal. As indicated by the vector diagram of Fig. 1m such information effectively occurs along axes which are at approximately an angle of 70°. It has been found that the signals on these axes can be considered to be substantially 90° out of phase with respect to each other or at substantially 180° phase points of a second harmonic of the subcarrier wave signal.

Therefore, the signal triode 131 can operate in such manner as to perform the function of one of the diodes of Fig. 2 by damping the components on approximately the G—.5R—.5B axis out of the circuit for translating approximately the R—B axis and performs the function of the other diode by translating approximately the G—.5R—.5B axis of the modulated subcarrier wave signal. In the manner explained with reference to such diodes a properly phased 7.2 megacycle signal is developed in the tuned circuit 113. This signal is applied to the control electrode of the triode 131 to cause it to be conductive during short intervals at the positive peaks of the 7.2 megacycle signal and to be otherwise nonconductive. When the triode 131 is conductive it translates the information on the cathode thereof to the anode thereof and applies such information to the modulator 44. Thus, if the triode is rendered conductive during that period of time when approximately the G—.5R—.5B axis of the NTSC subcarrier wave signal is on the cathode thereof, then the 3.6 megacycle NTSC subcarrier wave signal developed in the anode circuit thereof is modulated substantially only by the components along such axis. During the period of time the triode is conductive the 3.6 megacycle signals in the output circuit of the amplifier 28 are effectively shunted by such conduction and, therefore, no such signals are translated through the delay line 40. Since the axis of the wave signal occurring during such conduction is substantially in quadrature with the R—B axis, only the R—B axis is translated through the delay line 40 for application to the control electrode of the tube 30. Thus, the fundamental and second harmonic of the chromaticity signal applied to the cathode and control-electrode circuits of the tube 30 include substantially only the information along the desired axes as explained with reference to Fig. 2. As a result, the color contamination caused by the previously considered higher order effects are diminished.

The color balance effected by the application of the 3.6 megacycle signal from the transformer 34 to the screen electrode of the picture tube 30 is a simplified form of that described with reference to Fig. 2. There is no attempt in the system of Fig. 3 to correct the level of the 3.6 megacycle signal for variations in brightness levels.

Description of image-reproducing system of Fig. 4

The image-reproduction system of Fig. 4 represents another modified form of the axis-selector type system initially described with reference to Fig. 2 and further considered in Fig. 3. Since the system of Fig. 4 includes many units similar to units in the systems of Figs. 1, 2, and 3, such units are identified by the same reference numerals. Units in the system of Fig. 4 which are analogous to units of Fig. 1 are identified by reference numerals of such analogous units with a factor of 400 added thereto. Units and elements first described in the system of Fig. 4 are identified with numerals in the group 151—170.

In the system of Fig. 4, the output circuit of the amplifier 243 is coupled through a parallel-tuned circuit 151 and an inductor 152, in series, to a source of potential +B. Another parallel-tuned circuit 153 is inductively coupled to the circuit 151 so as to effect a quadrature-phase shift of the signals translated through the circuits 151 and 153, this coupling being discussed more fully hereinafter. The circuit 153 has one terminal thereof coupled through a signal sampling device 154, which includes a pair of oppositely-poled diode circuits, to a winding of a transformer 155. The other winding of the transformer 155 is coupled to an output circuit of the amplifier 35 and the other terminal of the tuned circuit 153 is connected through a winding 156 to ground. A parallel-tuned circuit 157 is inductively coupled to the inductor 152 so that effectively no phase shift of the signals translated through the inductor 152 and the tuned circuit 157 occurs. One terminal of the tuned circuit 157 is coupled through a sampling device 158 similar to the device 154 to the winding of the transformer 155 while the other terminal of the circuit 157 is connected through an inductor 159, a parallel-tuned circuit 160, and a load circuit 161 in cascade, in the order named, to ground. The tuned circuit 160 is resonant at the second harmonic frequency of the NTSC subcarrier wave signal, that is, at approximately 7.2 megacycles and the load circuit 161 includes, in parallel, a series-resonant circuit for shunting high-frequency signals and a high-impedance circuit for low-frequency signals to develop a low-frequency M—Y correction signal. A parallel-resonant circuit 162 tuned to the fundamental frequency of the NTSC wave signal is inductively coupled to the winding 156 and another parallel-tuned circuit 163 resonant at the third harmonic of the NTSC wave signal is inductively coupled to the winding 159. The circuits 162, 163, 160, and 161 are coupled in series, in the order named, and comprise an input load circuit for an amplifier 164. The output circuit of the amplifier 164 is connected to the cathode of the picture tube 30. The relative impedances of the units 162, 163, 160, and 161 are proportioned in a manner to be explained more fully hereinafter for reasons expressed at such time.

The circuit coupling the secondary winding of the transformer 34 to the grid structure 33 in the picture tube 30 includes a condenser 165, a choke 166, and a tapped portion of a voltage divider 167 in series between one terminal of the secondary winding of the transformer 34 and the center tap of such winding. The voltage divider 167 is connected between two high-potential sources so that there is substantially a 500 volt drop thereacross.

Explanation of operation of the image-reproducing system of Fig. 4

For reasons relating to minimizing of color cross talk, it is sometimes beneficial to utilize modulation components of the modulated NTSC subcarrier wave signal other than the color-difference components B—Y, R—Y or the color components G, R, and B. Two components I and Q have been utilized and they have phase relations and magnitudes with respect to the B—Y and R—Y components previously considered herein such as represented by the vector diagram of Fig. 4a. These I and Q modulation axes of the modulated NTSC subcarrier wave signal are utilized in the operation of the system of Fig. 4.

In the system of Fig. 4 a unidirectional bias potential is developed at the tap point of the voltage divider 167 and applied as a bias between the pairs of grids individually positioned behind the red and blue phosphors. This bias causes the beam, which would normally have each vertical excursion thereof centered on each green phosphor as a line is being scanned, to be displaced from such center position so that the color-switching signal tends to cause the beam to impinge on either the red or blue phosphors for a longer time. As explained previously herein, the red phosphor is relatively inefficient with respect to the green and blue phosphors and thus in the system of Fig. 4 the bias potential is such as to cause the center of the vertical excursions of the beam to be displaced on each green phosphor toward the adjacent red phosphor. This causes the beam to impinge for a longer time on the red phosphor, sufficiently long to compensate for its relative inefficiency, and for a shorter time on the blue phosphor. Also the times during which the beam impinges on the green phosphor are no longer 180° apart on the color-switching cycle. Thus the type of modified signal discussed with reference to the prior figures herein should not be used with the system of Fig. 4 if a high degree of color fidelity in reproduction desired. However, by utilizing the analytical approach discussed herein with respect to Fig. 1b, the proper signal for application to a picture tube employing color-balance compensation by decentering the electron beam with respect to the vertical midpoint of the green phosphors may be developed.

In developing Equations (1) and (2) with respect to Fig.

1b and the other equations following therefrom, it was explained that a sampling operation could be defined in terms of a Fourier series and that the composite effect of many sampling operations in a color-switching cycle could be developed by combining the effects of the samples. In the system of Fig. 1b such samples were symmetrical in quantity and with respect to the three primary colors. In the beam-decentered system of Fig. 4 such samples are not symmetrical with respect to the three colors. Taking such asymmetry into consideration, and using the type of analysis employed with respect to Fig. 1b, equations can be developed which define the type of modified NTSC signal to be employed in the system of Fig. 4. Such analysis leads to the finding that the M—Y correction signal should be approximately .4Q and that the modified NTSC subcarrier wave signal should include a fundamental component of approximately +1.1I, a second harmonic component of approximately +77Q, and a third harmonic component of approximately —1.2Q where all such intensities are with respect to an intensity of unity for the brightness signal Y. The system 413 of Fig. 4 effects such combination of signal components to develop a modified NTSC subcarrier wave signal suitable for utilization in the picture tube 30.

Considering now the operation of the system 413 of Fig. 4, as previously described herein, the 3.6 megacycle signal developed in the output circuit of the amplifier 35 and employed as the color-switching signal is in phase with the I axis of the modified NTSC modulated subcarrier wave signal as applied to the cathode of the picture tube. This 3.6 megacycle signal is applied through the transformer 155 to each of the sampling devices 154 and 158. The NTSC subcarrier wave signal applied to the tuned circuit 151 is inductively coupled to the tuned circuit 153 and applied to the sampling device 154. The phasing of the NTSC signal translated through the circuits 151 and 153 is modified so that the I axis of such signal is in phase with the 3.6 megacycle reference signal applied to the device 154 and thus components along the I axis are translated through the device 154 and inductively coupled through the winding 156 for developing a 3.6 megacycle signal including such I components in the tuned circuit 162 with an intensity of +1.1I. The NTSC signal applied to the winding 152, inductively coupled through the tuned circuit 157 and applied to the sampling device 158, has the Q axis thereof in phase with the 3.6 megacycle reference signal also applied to the sampling device 158. Therefore, the modulation components along such axis are translated through the device 158, through the winding 159 and applied to the circuits 163, 160, and 161. In the circuit 163 a third harmonic or 10.8 megacycle signal is developed wich is effectively modulated solely by a —1.2Q component. In the circuit 160 a second harmonic or 7.2 megacycle signal is developed which is effectively modulated by +.77Q and in the circuit 161 a low-frequency .4Q signal is developed. The latter .4Q component represents the previously considered M—Y correction signal while the signals in the circuits 162, 163, and 160 combine to develop a composite signal which is proper for utilization with the picture tube 30 wherein the beam has been decentered so as to impinge for a longer time on the red phosphors. This modified subcarrier wave signal and the low-frequency signal which is the equivalent of the M—Y correction signal are amplified in the unit 164 and applied to the cathode of the picture tube 30. The luminance signal is applied to the control electrode of such tube. The tube 30 operates in the manner previously described herein to reproduce a color image from such applied signals.

It should be noted with respect to the system of Fig. 4 that, whereas in the systems of Figs. 1, 2, and 3 there was no detection of green from the fundamental signal thus resulting in lack of constant luminance requiring the development of an M—Y correction signal utilized to correct for both the fundamental and second harmonic signals, there is some detection of green from the fundamental signal in the system of Fig. 4 because of the exciting of the green phosphors at other than 180° phase points on the color-switching signal. The amount of detection of the green component from the fundamental signal in Fig. 4 can be so adjusted by a selected amount of decentering of the beam as to effect sufficient green to combine with the red and blue detected from the fundamental signal to give constant luminance operation for the fundamental signal. In such case the luminance-correction signal developed in the circuit 161 of Fig. 4 need only correct for luminance errors in the higher-frequency modulated subcarrier wave signals applied to the picture tube.

Description and explanation of operation of image-reproducting system of Fig. 5

In the previously described image-reproducing systems, the color-switching frequency employed was equal to the mean frequency of the unmodified NTSC subcarrier wave signal. It is not essential that this frequency relation exists and in the system of Fig. 5 a subharmonic color-switching frequency, specifically, a frequency of 1.8 megacycles is employed.

Since the system of Fig. 5 includes many units similar to units in the systems of Figs. 1, 2, and 3, such units are identified by the same reference numerals. Units in the system of Fig. 5 which are analogous to units in the system of Fig. 1 are identified by the reference numerals of such analogous units with a factor of 500 added thereto. Units and elements first described in Fig. 5 are identified by numerals in the group 171–175.

The system of Fig. 5 differs in a minor respect from the system of Fig. 1 in utilizing a direct-current restorer 342 similar to a unit in Fig. 3 in the channel for translating the signal in such channel. However, a more important difference is that a seventh harmonic amplifier 171 is coupled between the output circuit of the push-pull amplifier 535 and the screen electrode of the picture tube to effect seventh-harmonic gating of the beam and an amplifier 243 is utilized in place of the filter network 43 of Fig. 1. The color-reference signal generator 521 differs from the analogous unit in Fig. 1 in that the parameters thereof are proportioned to generate a signal of 1.8 megacycles.

The system of Fig. 5 operates substantially in the same manner as the system of Fig. 1, except that the utilization of a color-switching frequency of 1.8 megacycles requires a modification of the frequencies of the subcarrier wave signals translated through the system of Fig. 5. To effect such result, the signal developed in the output circuit of the push-pull amplifier 535 has a frequency of 1.8 megacycles and thus the signal developed in the output circuit of the third harmonic amplifier 546 and applied to the modulator 544 has a frequency of 5.4 megacycles resulting in the development of a 1.8 megacycle subcarrier wave signal in the output circuit of the unit 544 and this is coupled through the tuned circuit 545 and the inductor 172 to the cathode of the tube 30. The 1.8 megacycle cycle is the fundamental-frequency signal previously discussed herein with reference to the prior figures and the 3.6 megacycle subcarrier wave signal translated through the luminance channel becomes the second harmonic signal. Thus the phasing of these signals is adjusted in the different channels through which they are translated as the phases of the fundamental and second harmonic signals were adjusted as explained with reference to Figs. 1 and 1b. The signal developed in the output circuit of the modulator 544, being the fundamental signal, is utilized as the subcarrier wave signal to be applied to the phase-detector system through the pair of terminals 23, 23 and is also applied as the subcarrier wave signal to the synchronous detector 550. In the detector 550 the two 1.8 megacycle signals applied thereto heterodyne to effect synchronous detection of the M—Y correction signal from the applied 1.8 megacycle subcarrier wave signal.

The seventh harmonic amplifier is utilized to effect the color balance previously considered with reference to Figs. 2 and 4 by gating the electron beam so that it impinges three time on the phosphor for developing red while impinging only twice on the phosphors for developing green and blue. To effect such result, the signal developed in the output circuit of the unit 171 is so phased with respect to the color-switching signal that the three positive peaks of the gating signal occur during that period of time when the beam is impinging on the phosphor for reproducing red. In this manner, more beam energy is applied to such phosphor to compensate for the inefficiency thereof and to effect color balance for reproducing black and white color images. Also, since such gating will have some effect on the energies of the derived colors, a modified NTSC subcarrier wave signal such as described with reference to Fig. 4 may be required to obtain maximum color fidelity.

There has been described herein image-reproducing systems for effecting modification of a conventional NTSC type of video-frequency signal so that such signal may be directly utilized with a one-gun sequential-type of picture tube without any demodulation of the modulation components of such subcarrier wave signal and, therefore, without the need of effecting modulation of an auxiliary subcarrier wave signal. By directly translating the modulated subcarrier wave signal without demodulation of the components thereof, the need for effecting critical balance of the gains of different color signal-translating channels is not introduced and thus the problem of maintaining the proper relative relations of the different color components is simplified. The modification of the conventional NTSC subcarrier wave signal is effected by permitting substantially direct translation of the modulated subcarrier wave signal and by adding or combining therewith harmonics thereof. In this manner, a modified NTSC type of wave signal may be developed which can be employed with a single-gun type of tube such as mentioned above and 100 percent utilization of the beam energy may be obtained. In other words, none of the beam energy need be lost because of gating either electrically or by means of physical apertures.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An image-reproducing system for a color-television receiver comprising: a circuit for supplying an NTSC signal including a first signal primarily representative of the brightness and a subcarrier wave signal representative of the chromaticity of a televised image; color image-reproducing apparatus including a multicolor image screen and means for scanning said screen with an electron beam having means for conditioning said apparatus to develop a plurality of colors in a sequence repeating at a predetermined frequency in which one of the colors occurs twice; signal-modifying apparatus coupled to said supply circuit for translating said modulated subcarrier wave signal at a predetermined phase with respect to said sequence and for deriving from said subcarrier wave signal a modulated wave signal differing in frequency therefrom and which is a harmonic of said predetermined frequency and has a predetermined phase with respect to said sequence; and a circuit for applying said first signal, said translated modulated subcarrier wave signal, and said derived wave signal to said apparatus for reproducing said color image.

2. An image-reproducing system for a color-television receiver comprising: a circuit for supplying an NTSC signal including a first signal primarily representative of the brightness and a subcarrier wave signal representative of the chromaticity of a televised image; color image-reproducing apparatus including a multicolor image screen and means for scanning said screen with an electron beam having means for conditioning said apparatus to develop a plurality of colors in a sequence repeating at the frequency of said subcarrier wave signal and in which one of the colors occurs twice; signal-modifying apparatus coupled to said supply circuit for translating said modulated subcarrier wave signal at a predetermined phase with respect to said sequence and for deriving from said subcarrier wave signal a modulated wave signal having twice the frequency of said subcarrier wave signal and having a predetermined phase with respect to said sequence; and a circuit for applying said first signal, said translated modulated subcarrier wave signal, and said derived wave signal to said apparatus for reproducing said color image.

3. An image-reproducing system for a color-television receiver comprising: a circuit for supplying a first signal primarily representative of the brightness of a televised color image and a subcarrier wave signal having successive cycles thereof modulated in phase by signal components representative of hue so that said cycles have substantially the same phase-hue characteristics, and said cycles being modulated in amplitude by signal components representative of the color saturation of successive elemental areas of said color image; color image-reproducing apparatus including a multicolor image screen and means for scanning said screen with an electron beam to develop light on said screen of a plurality of component colors, said scanning means including a control circuit for conditioning said apparatus to develop said component colors in a sequence repeating at a predetermined frequency and in which one of said component colors occurs twice; signal-modifying apparatus coupled to said supply circuit and effectively including one signal-translating channel for translating said modulated subcarrier wave signal at a predetermined phase with respect to said sequence and effectively including another signal-translating channel having signal-modifying means for developing from said subcarrier wave signal another wave signal differing in frequency from said translated subcarrier wave signal, and which is a harmonic of said predetermined frequency and having a predetermined phase with respect to said sequence; and a circuit for applying said first signal, said translated modulated subcarrier wave signal, and said other wave signal to said apparatus for reproducing said color image.

4. An image-reproducing system for a color-television receiver comprising: a circuit for supplying a first signal primarily representative of the brightness of a televised color image and a subcarrier wave signal having successive cycles thereof modulated in phase by signal components representative of hue so that said cycles have substantially the same phase-hue characteristic, and said cycles being modulated in amplitude by signal components representative of the color saturation of successive elemental areas of said color image; color image-reproducing apparatus including a multicolor image screen and means for scanning said screen with an electron beam to develop light on said screen of a plurality of component colors, said scanning means including a control circuit for conditioning said apparatus to develop said component colors in a sequence repeating at a predetermined frequency and in which one of said component colors occurs twice; signal-modifying apparatus coupled to said supply circuit and effectively including one signal-translating channel for translating said first signal and for translating said modulated subcarrier wave signal at a predetermined phase with respect to said sequence and effectively including another signal-translating channel having a source of a signal having triple the frequency of said subcarrier wave signal and having a modulator coupled to said source and responsive to said subcarrier wave signal for developing from said subcarrier wave signal another wave signal which has twice the frequency thereof and has a predetermined phase with respect to said sequence; and a circuit for applying said first signal, said translated modulated subcarrier wave signal, and said other wave signal to said apparatus for reproducing said color image.

5. An image-reproducing system for a color-television receiver comprising: a circuit for supplying a first signal primarily representative of the brightness of a televised color image and a subcarrier wave signal having successive cycles thereof modulated in phase by signal components representative of hue so that said cycles have substantially the same phase-hue characteristic, and said cycles being modulated in amplitude by signal components representative of the color saturation of successive elemental areas of said color image; color image-reproducing apparatus including a multicolor image screen and means for scanning said screen with an electron beam to develop light on said screen of a plurality of component colors, said scanning means including a control circuit for conditioning said apparatus to develop said component colors in a sequence repeating at a predetermined frequency and in which one of said component colors occurs twice; signal-modifying apparatus coupled to said supply circuit and effectively including one signal-translating channel for translating said modulated subcarrier wave signal including a signal-sampling device for effecting translation of substantially only that fraction of said subcarrier wave signal which is at a predetermined phase with respect to said sequence and effectively including another signal-translating channel having another signal-sampling device for effecting translation of substantially only that fraction of said subcarrier wave signal which has a different predetermined phase with respect to said sequence and having signal-modifying means for developing from said fraction of said subcarrier wave signal translated through said other channel another wave signal differing in frequency from said translated subcarrier wave signal, and which is a harmonic of said predetermined frequency and having a predetermined phase with respect to said sequence; and a circuit for applying said first signal, said translated modulated subcarrier wave signal, and said other wave signal to said apparatus for reproducing said color image.

6. An image-reproducing system for a color-television receiver comprising: a circuit for supplying a first signal primarily representative of the brightness of a televised color image and a subcarrier wave signal having successive cycles thereof modulated in phase by signal components representative of hue so that said cycles have substantially the same phase-hue characteristic, and said cycles being modulated in amplitude by signal components representative of the color saturation of successive elemental areas of said color image; color image-reproducing apparatus including a multicolor image screen and means for scanning said screen with an electron beam to develop light on said screen of a plurality of component colors, said scanning means including a control circuit for conditioning said apparatus to develop said component colors in a sequence repeating at a predetermined frequency and in which one of said component colors occurs twice; signal-modifying apparatus coupled to said supply circuit and effectively including one signal-translating channel for translating said modulated subcarrier wave signal including a signal-sampling device for effecting translation of substantially only that fraction of said subcarrier wave signal which is at a predetermined phase with respect to said sequence and effectively including another signal-translating channel coupled to said signal-sampling device for effecting translation of substantially only the complementary fraction of said subcarrier wave signal and having signal-modifying means for developing from said complementary fraction of said subcarrier wave signal another wave signal differing in frequency from said translated subcarrier wave signal, and which is a harmonic of said predetermined frequency and having a predetermined phase with respect to said sequence; and a circuit for applying said first signal, said translated modulated subcarrier wave signal, and said other wave signal to said apparatus for reproducing said color image.

7. An image-reproducing system for a color-television receiver comprising: a circuit for supplying a first signal primarily representative of the brightness of a televised color image and a subcarrier wave signal having successive cycles thereof modulated in phase by signal components representative of hue so that said cycles have substantially the same phase-hue characteristic, and said cycles being modulated in amplitude by signal components representative of the color saturation of successive elemental areas of said color image; color image-reproducing apparatus including a multicolor image screen and means for scanning said screen with an electron beam to develop light on said screen of a plurality of component colors, said scanning means including a control circuit for conditioning said apparatus to develop said component colors in a sequence repeating at one-half the frequency of said subcarrier wave signal and in which one of said component colors occurs twice; signal modifying apparatus coupled to said supply circuit and effectively including one signal-translating channel for translating said modulated subcarrier wave signal at a predetermined phase with respect to said sequence and effectively including another signal-translating channel having signal-modifying means for developing from said subcarrier wave signal another wave signal which has substantially one-half the frequency of said translated subcarrier wave signal, and which is a first harmonic of said predetermined frequency and has a predetermined phase with respect to said sequence; and a circuit for applying said first signal, said translated modulated subcarrier wave signal, and said other wave signal to said apparatus for reproducing said color image.

8. An image-reproducing system for a color-television receiver comprising: a circuit for supplying a first signal primarily representative of the brightness of a televised color image and a subcarrier wave signal having successive cycles thereof modulated in phase by signal components representative of hue so that said cycles have substantially the same phase-hue characteristic, and said cycles being modulated in amplitude by signal components representative of the color saturation of successive elemental areas of said color image; color image-reproducing apparatus including a multicolor image screen and means for scanning said screen with an electron beam to develop light on said screen of a plurality of component colors, said scanning means including a control circuit for conditioning said apparatus to develop said component colors in a sequence repeating at a predetermined frequeny and in which one of said component colors occurs twice; signal-modifying apparatus coupled to said supply circuit and effectively including one signal-translating channel for translating said modulated subcarrier wave signal including a diode circuit for effecting translation of substantially only that fraction of said subcarrier wave signal which is at a predetermined phase with respect to said sequence, said diode circuit shunting the complementary fraction of said wave signal and said apparatus effectively including another signal-translating channel having another diode circuit for effecting translation of substantially only said complementary fraction of said subcarrier wave signal and for shunting said fraction of said wave signal translated by said one channel, said other channel having signal-modifying means for developing from said complementary fraction of said subcarrier wave signal another wave signal differing in frequency from said translated subcarrier wave signal, and which is a harmonic of said predetermined frequency and having a predetermined phase with respect to said sequence; and a circuit for applying said first signal, said translated modulated subcarrier wave signal, and said other wave signal to said apparatus for reproducing said color image.

*9. A color-television system comprising: color-image-reproducing apparatus including a multicolor image screen and means for scanning the screen with an electron beam and having means for conditioning the apparatus to develop a plurality of colors in a sequence repeating at a predetermined frequency in which there are two reverse sequences; means for supplying an input signal including a plurality of modulation components of a basic carrier frequency signal; signal-modifying means for deriving said modulation components at different harmonics of said basic carrier frequency, said modifying means including a plurality of channels each having a transducer for multiplying one of the modulation components by a wave of a frequency substantially integrally related to said basic carrier frequency, at least one of the multiplying waves being the second harmonic of the basic carrier frequency; and means connecting said channels to said image-reproducing apparatus for additively applying said derived signals to the apparatus.*

References Cited in the file of this patent or the original patent

UNITED STATES PATENTS

| | | |
|---|---|---|
| 2,446,791 | Schroeder | Aug. 10, 1948 |
| 2,635,140 | Dome | Apr. 14, 1953 |
| 2,648,722 | Bradley | Aug. 11, 1953 |
| 2,668,189 | Reddeck | Feb. 2, 1954 |